United States Patent
Kommula

(10) Patent No.: US 9,015,323 B2
(45) Date of Patent: *Apr. 21, 2015

(54) GLOBAL SERVER LOAD BALANCING

(75) Inventor: Sunanda L. Kommula, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/635,371

(22) Filed: Dec. 10, 2009

(65) Prior Publication Data

US 2010/0153558 A1 Jun. 17, 2010

Related U.S. Application Data

(63) Continuation of application No. 10/376,903, filed on Feb. 28, 2003, now Pat. No. 7,657,629, which is a continuation-in-part of application No. 10/206,580, filed on Jul. 25, 2002, now Pat. No. 7,254,626, which is a continuation-in-part of application No. 09/670,487, filed on Sep. 26, 2000, now Pat. No. 7,454,500.

(51) Int. Cl.
  *G06F 15/173* (2006.01)
  *H04L 29/12* (2006.01)
  *H04L 29/08* (2006.01)

(52) U.S. Cl.
  CPC ...... *H04L 61/1511* (2013.01); *H04L 29/12066* (2013.01); *H04L 67/1008* (2013.01); *H04L 67/1021* (2013.01); *H04L 67/1002* (2013.01); *H04L 67/1012* (2013.01)

(58) Field of Classification Search
  CPC .............. H04L 61/151; H04L 29/1206; H04L 67/1008; H04L 67/1021; H04L 67/1002; H04L 67/1012

USPC .......... 709/226, 224, 245, 238–241
See application file for complete search history.

(56) References Cited

U.S. PATENT DOCUMENTS

| | | | |
|---|---|---|---|
| 5,031,094 A | 7/1991 | Toegel et al. | 364/200 |
| 5,359,593 A | 10/1994 | Derby et al. | 370/17 |

(Continued)

FOREIGN PATENT DOCUMENTS

| | | |
|---|---|---|
| EP | 1128613 | 8/2001 |
| WO | 01/39003 | 5/2001 |
| WO | 01/93530 | 12/2001 |

OTHER PUBLICATIONS

Kevin Delgadill, Cisco DistributedDirector 1999, white paper.*

(Continued)

*Primary Examiner* — Abdullahi Salad
(74) *Attorney, Agent, or Firm* — Novak Druce Connolly Bove + Quigg LLP

(57) ABSTRACT

A global server load-balancing (GSLB) switch serves as a proxy to an authoritative DNS and communicates with numerous site switches that are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches or based on other metric information. Examples of metrics include weighted site, weighted IP, and active bindings metrics. The GSLB switch places the address that is deemed "best" at the top of the list.

14 Claims, 5 Drawing Sheets

(56) References Cited

U.S. PATENT DOCUMENTS

| | | | | |
|---|---|---|---|---|
| 5,530,872 | A | 6/1996 | Smeltzer et al. | |
| 5,867,706 | A * | 2/1999 | Martin et al. | 718/105 |
| 5,918,017 | A | 6/1999 | Attanasio et al. | |
| 5,948,061 | A | 9/1999 | Merriman et al. | 709/219 |
| 5,951,634 | A | 9/1999 | Sitbon et al. | 709/105 |
| 6,006,269 | A | 12/1999 | Phaal | |
| 6,006,333 | A | 12/1999 | Nielsen | |
| 6,078,956 | A | 6/2000 | Bryant et al. | |
| 6,092,178 | A | 7/2000 | Jindal et al. | 712/27 |
| 6,112,239 | A | 8/2000 | Kenner et al. | 709/224 |
| 6,115,752 | A | 9/2000 | Chauhan | 709/241 |
| 6,119,143 | A | 9/2000 | Dias et al. | |
| 6,128,279 | A | 10/2000 | O'Neil et al. | 370/229 |
| 6,128,642 | A | 10/2000 | Doraswamy et al. | 709/201 |
| 6,134,588 | A * | 10/2000 | Guenthner et al. | 709/226 |
| 6,148,410 | A | 11/2000 | Baskey et al. | |
| 6,157,649 | A * | 12/2000 | Peirce et al. | 370/401 |
| 6,167,445 | A | 12/2000 | Gai et al. | |
| 6,167,446 | A | 12/2000 | Lister et al. | 709/223 |
| 6,178,160 | B1 * | 1/2001 | Bolton et al. | 370/255 |
| 6,182,139 | B1 | 1/2001 | Brendel | |
| 6,185,619 | B1 | 2/2001 | Joffe et al. | |
| 6,195,691 | B1 | 2/2001 | Brown | |
| 6,205,477 | B1 * | 3/2001 | Johnson et al. | 709/220 |
| 6,233,604 | B1 | 5/2001 | Van Horne et al. | 709/203 |
| 6,249,801 | B1 | 6/2001 | Zisapel et al. | |
| 6,256,671 | B1 * | 7/2001 | Strentzsch et al. | 709/227 |
| 6,260,070 | B1 | 7/2001 | Shah | |
| 6,262,976 | B1 | 7/2001 | McNamara | |
| 6,286,039 | B1 | 9/2001 | Van Horne et al. | 709/221 |
| 6,286,047 | B1 | 9/2001 | Ramanathan et al. | 709/224 |
| 6,304,913 | B1 * | 10/2001 | Rune | 709/241 |
| 6,317,775 | B1 * | 11/2001 | Coile et al. | 709/201 |
| 6,324,177 | B1 | 11/2001 | Howes et al. | |
| 6,324,580 | B1 | 11/2001 | Jindal et al. | 709/228 |
| 6,327,622 | B1 | 12/2001 | Jindal et al. | |
| 6,330,605 | B1 | 12/2001 | Christensen et al. | |
| 6,336,137 | B1 | 1/2002 | Lee et al. | |
| 6,378,068 | B1 | 4/2002 | Foster et al. | |
| 6,381,627 | B1 | 4/2002 | Kwan et al. | 709/201 |
| 6,389,462 | B1 | 5/2002 | Cohen et al. | 709/218 |
| 6,393,473 | B1 | 5/2002 | Chu | |
| 6,405,252 | B1 | 6/2002 | Gupta et al. | |
| 6,411,998 | B1 | 6/2002 | Bryant et al. | |
| 6,427,170 | B1 | 7/2002 | Sitaraman et al. | 709/226 |
| 6,434,118 | B1 | 8/2002 | Kirschenbaum | |
| 6,438,652 | B1 | 8/2002 | Jordan et al. | 711/120 |
| 6,446,121 | B1 | 9/2002 | Shah et al. | |
| 6,449,657 | B2 | 9/2002 | Stanbach, Jr. et al. | 709/245 |
| 6,470,389 | B1 | 10/2002 | Chung et al. | 709/227 |
| 6,473,802 | B2 | 10/2002 | Masters | |
| 6,480,508 | B1 | 11/2002 | Mwikalo et al. | 370/475 |
| 6,487,555 | B1 * | 11/2002 | Bharat et al. | 1/1 |
| 6,490,624 | B1 | 12/2002 | Sampson et al. | |
| 6,513,061 | B1 * | 1/2003 | Ebata et al. | 709/203 |
| 6,542,964 | B1 | 4/2003 | Scharber | |
| 6,549,944 | B1 | 4/2003 | Weinberg et al. | 709/224 |
| 6,578,066 | B1 | 6/2003 | Logan et al. | 709/105 |
| 6,578,077 | B1 | 6/2003 | Rakoshitz et al. | |
| 6,601,084 | B1 | 7/2003 | Bhaskaran et al. | |
| 6,606,643 | B1 | 8/2003 | Emens et al. | 709/203 |
| 6,611,861 | B1 | 8/2003 | Schairer et al. | |
| 6,647,009 | B1 * | 11/2003 | Kubota et al. | 370/390 |
| 6,665,702 | B1 | 12/2003 | Zisapel et al. | |
| 6,681,232 | B1 | 1/2004 | Sistanizadeh et al. | 707/104.1 |
| 6,681,323 | B1 | 1/2004 | Fontanesi et al. | 713/1 |
| 6,684,250 | B2 | 1/2004 | Anderson et al. | |
| 6,691,165 | B1 | 2/2004 | Bruck et al. | |
| 6,701,368 | B1 | 3/2004 | Chennapragada et al. | |
| 6,725,253 | B1 | 4/2004 | Okano et al. | |
| 6,745,241 | B1 | 6/2004 | French et al. | |
| 6,748,416 | B2 | 6/2004 | Carpenter et al. | |
| 6,754,699 | B2 | 6/2004 | Swildens et al. | |
| 6,760,775 | B1 | 7/2004 | Anerousis | |
| 6,772,211 | B2 | 8/2004 | Lu et al. | |
| 6,775,230 | B1 | 8/2004 | Watanabe et al. | |
| 6,779,017 | B1 | 8/2004 | Lamberton et al. | |
| 6,785,704 | B1 | 8/2004 | McCanne | |
| 6,789,125 | B1 | 9/2004 | Aviani et al. | 709/238 |
| 6,795,434 | B1 * | 9/2004 | Kumar et al. | 370/392 |
| 6,795,858 | B1 | 9/2004 | Jain et al. | |
| 6,795,860 | B1 * | 9/2004 | Shah | 709/229 |
| 6,801,949 | B1 * | 10/2004 | Bruck et al. | 709/232 |
| 6,810,411 | B1 * | 10/2004 | Coughlin et al. | 709/203 |
| 6,826,198 | B2 | 11/2004 | Turina et al. | |
| 6,839,700 | B2 | 1/2005 | Doyle et al. | |
| 6,850,984 | B1 | 2/2005 | Kalkunte et al. | |
| 6,862,627 | B1 | 3/2005 | Cheshire | |
| 6,874,152 | B2 | 3/2005 | Vermeire et al. | |
| 6,879,995 | B1 | 4/2005 | Chinta et al. | |
| 6,880,000 | B1 * | 4/2005 | Tominaga et al. | 709/220 |
| 6,883,028 | B1 | 4/2005 | Johnson et al. | |
| 6,898,633 | B1 | 5/2005 | Lyndersay et al. | 709/226 |
| 6,901,081 | B1 | 5/2005 | Ludwig | |
| 6,920,498 | B1 | 7/2005 | Gourlay et al. | |
| 6,928,485 | B1 | 8/2005 | Krishnamurthy et al. | |
| 6,950,848 | B1 | 9/2005 | Yousefi'zadeh | |
| 6,963,914 | B1 | 11/2005 | Breibart et al. | 709/226 |
| 6,963,917 | B1 | 11/2005 | Callis et al. | 709/227 |
| 6,985,956 | B2 | 1/2006 | Luke et al. | |
| 6,987,763 | B2 | 1/2006 | Rochberger et al. | 370/389 |
| 6,996,551 | B2 | 2/2006 | Hellerstein et al. | |
| 6,996,615 | B1 | 2/2006 | McGuire | |
| 6,996,616 | B1 | 2/2006 | Leighton et al. | |
| 7,000,007 | B1 | 2/2006 | Valenti | 709/219 |
| 7,020,698 | B2 | 3/2006 | Andrews et al. | 709/223 |
| 7,020,714 | B2 | 3/2006 | Kalyanaraman et al. | |
| 7,028,083 | B2 | 4/2006 | Levine et al. | |
| 7,032,010 | B1 | 4/2006 | Swildens et al. | 709/219 |
| 7,032,031 | B2 | 4/2006 | Jungck et al. | |
| 7,036,039 | B2 | 4/2006 | Holland | |
| 7,047,300 | B1 * | 5/2006 | Oehrke et al. | 709/226 |
| 7,058,706 | B1 | 6/2006 | Iyer et al. | |
| 7,058,717 | B2 | 6/2006 | Chao et al. | |
| 7,062,562 | B1 | 6/2006 | Baker et al. | |
| 7,062,642 | B1 | 6/2006 | Langrind et al. | |
| 7,080,138 | B1 | 7/2006 | Baker et al. | |
| 7,082,102 | B1 | 7/2006 | Wright | |
| 7,086,061 | B1 | 8/2006 | Joshi et al. | 718/105 |
| 7,089,293 | B2 | 8/2006 | Grosner et al. | |
| 7,099,915 | B1 * | 8/2006 | Tenereillo et al. | 709/203 |
| 7,114,008 | B2 | 9/2006 | Jungck et al. | |
| 7,117,269 | B2 | 10/2006 | Lu et al. | |
| 7,117,530 | B1 | 10/2006 | Lin | |
| 7,124,188 | B2 | 10/2006 | Mangipudi et al. | |
| 7,127,713 | B2 | 10/2006 | Davis et al. | |
| 7,136,932 | B1 | 11/2006 | Schneider | |
| 7,139,242 | B2 | 11/2006 | Bays | |
| 7,177,933 | B2 | 2/2007 | Foth | |
| 7,185,052 | B2 | 2/2007 | Day | |
| 7,194,553 | B2 | 3/2007 | Lucco et al. | |
| 7,197,547 | B1 | 3/2007 | Miller et al. | |
| 7,206,806 | B2 | 4/2007 | Pineau | |
| 7,213,068 | B1 | 5/2007 | Kohli et a | |
| 7,225,236 | B1 | 5/2007 | Puthiyandyil et al. | |
| 7,225,272 | B2 | 5/2007 | Kelley et al. | |
| 7,240,015 | B1 | 7/2007 | Karmouch et al. | |
| 7,240,100 | B1 | 7/2007 | Wein et al. | |
| 7,254,626 | B1 | 8/2007 | Kommula et al. | |
| 7,257,642 | B1 | 8/2007 | Bridger et al. | |
| 7,260,645 | B2 | 8/2007 | Bays | |
| 7,277,954 | B1 | 10/2007 | Stewart et al. | |
| 7,289,519 | B1 | 10/2007 | Liskov | |
| 7,296,088 | B1 | 11/2007 | Padmanabhan et al. | |
| 7,321,926 | B1 | 1/2008 | Zhang et al. | |
| 7,330,908 | B2 | 2/2008 | Jungck | |
| 7,383,288 | B2 | 6/2008 | Miloushev et al. | |
| 7,423,977 | B1 | 9/2008 | Joshi et al. | |
| 7,441,045 | B2 | 10/2008 | Skene et al. | |
| 7,454,500 | B1 | 11/2008 | Hsu et al. | |
| 7,478,148 | B2 | 1/2009 | Neerdaels | |
| 7,496,651 | B1 | 2/2009 | Joshi | |
| 7,523,181 | B2 | 4/2009 | Swildens et al. | |
| 7,573,886 | B1 | 8/2009 | Ono | |

(56) References Cited

U.S. PATENT DOCUMENTS

| | | | |
|---|---|---|---|
| 7,574,508 B1 | 8/2009 | Kommula | |
| 7,581,006 B1 | 8/2009 | Lara et al. | |
| 7,581,009 B1 | 8/2009 | Hsu et al. | |
| 7,584,262 B1 | 9/2009 | Wang et al. | |
| 7,584,301 B1 | 9/2009 | Joshi | |
| 7,653,700 B1 | 1/2010 | Bahl et al. | |
| 7,657,629 B1 | 2/2010 | Kommula | |
| 7,676,576 B1 | 3/2010 | Kommula | |
| 7,734,683 B1 * | 6/2010 | Bergenwall et al. | 709/203 |
| 7,756,965 B2 | 7/2010 | Joshi | |
| 7,840,678 B2 | 11/2010 | Joshi | |
| 7,860,964 B2 | 12/2010 | Brady et al. | |
| 7,885,188 B2 | 2/2011 | Joshi | |
| 7,886,023 B1 | 2/2011 | Johnson | |
| 7,899,899 B2 | 3/2011 | Joshi | |
| 7,899,911 B2 | 3/2011 | Jensen et al. | |
| 7,925,713 B1 | 4/2011 | Day et al. | |
| 7,949,757 B2 | 5/2011 | Joshi | |
| 8,024,441 B2 | 9/2011 | Kommula et al. | |
| 8,527,639 B1 * | 9/2013 | Liskov et al. | 709/228 |
| 2001/0049741 A1 * | 12/2001 | Skene et al. | 709/232 |
| 2001/0052016 A1 | 12/2001 | Skene et al. | 709/226 |
| 2002/0026551 A1 | 2/2002 | Kamimaki et al. | 710/260 |
| 2002/0038360 A1 | 3/2002 | Andrews et al. | |
| 2002/0049778 A1 | 4/2002 | Bell et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | 709/225 |
| 2002/0078233 A1 | 6/2002 | Biliris et al. | 709/238 |
| 2002/0087722 A1 | 7/2002 | Datta et al. | |
| 2002/0091840 A1 | 7/2002 | Pulier et al. | 709/228 |
| 2002/0107841 A1 | 8/2002 | Hellerstein et al. | |
| 2002/0112036 A1 | 8/2002 | Bohannon et al. | 709/220 |
| 2002/0120743 A1 | 8/2002 | Shabtay et al. | 709/226 |
| 2002/0120763 A1 | 8/2002 | Miloushev et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0156916 A1 | 10/2002 | Watanabe | |
| 2002/0186698 A1 | 12/2002 | Ceniza | |
| 2002/0188862 A1 | 12/2002 | Trethewey et al. | 713/201 |
| 2002/0194324 A1 | 12/2002 | Guha | |
| 2002/0194335 A1 | 12/2002 | Maynard | 709/225 |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | 709/203 |
| 2003/0065762 A1 | 4/2003 | Stolorz et al. | |
| 2003/0065763 A1 | 4/2003 | Swildens et al. | 709/224 |
| 2003/0074472 A1 | 4/2003 | Lucco et al. | |
| 2003/0105797 A1 | 6/2003 | Dolev et al. | 709/105 |
| 2003/0115283 A1 | 6/2003 | Barbir et al. | |
| 2003/0135509 A1 | 7/2003 | Davis et al. | 707/100 |
| 2003/0154239 A1 | 8/2003 | Davis et al. | |
| 2003/0177240 A1 | 9/2003 | Gulko et al. | |
| 2003/0210686 A1 | 11/2003 | Terrell et al. | 370/389 |
| 2003/0210694 A1 | 11/2003 | Jayaraman et al. | 370/392 |
| 2003/0229697 A1 | 12/2003 | Borella | |
| 2004/0019680 A1 | 1/2004 | Chao et al. | |
| 2004/0024872 A1 | 2/2004 | Kelley et al. | 709/225 |
| 2004/0039798 A1 | 2/2004 | Hotz et al. | |
| 2004/0039847 A1 | 2/2004 | Persson et al. | |
| 2004/0064577 A1 | 4/2004 | Dahlin et al. | |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2004/0255018 A1 | 12/2004 | Taraci | |
| 2004/0259565 A1 | 12/2004 | Lucidarme | |
| 2005/0002410 A1 | 1/2005 | Chao et al. | |
| 2005/0021883 A1 | 1/2005 | Shishizuka et al. | 710/20 |
| 2005/0033858 A1 | 2/2005 | Swildens et al. | 709/232 |
| 2005/0086295 A1 | 4/2005 | Cunningham et al. | 709/203 |
| 2005/0149531 A1 | 7/2005 | Srivastava | 707/10 |
| 2005/0169180 A1 | 8/2005 | Ludwig | |
| 2005/0286416 A1 | 12/2005 | Shimonishi et al. | |
| 2006/0020715 A1 | 1/2006 | Jungck | |
| 2006/0036743 A1 | 2/2006 | Deng et al. | |
| 2006/0167894 A1 | 7/2006 | Wunner | |
| 2006/0209689 A1 | 9/2006 | Nakano et al. | |
| 2007/0168448 A1 | 7/2007 | Garbow et al. | |
| 2007/0168547 A1 | 7/2007 | Krywaniuk | |
| 2007/0180113 A1 | 8/2007 | Van Bemmel | |
| 2007/0208877 A1 | 9/2007 | Kelley et al. | |
| 2008/0016233 A1 | 1/2008 | Schneider | |
| 2008/0037420 A1 | 2/2008 | Tang | |
| 2008/0123597 A1 | 5/2008 | Arbol et al. | |
| 2008/0144784 A1 | 6/2008 | Limberg | |
| 2008/0147866 A1 | 6/2008 | Stolorz et al. | |
| 2008/0207200 A1 | 8/2008 | Fein et al. | |
| 2010/0010991 A1 | 1/2010 | Joshi | |
| 2010/0011120 A1 | 1/2010 | Kommula | |
| 2010/0011126 A1 | 1/2010 | Hsu et al. | |
| 2010/0061236 A1 | 3/2010 | Joshi | |
| 2010/0082787 A1 | 4/2010 | Kommula et al. | |
| 2010/0095008 A1 | 4/2010 | Joshi | |
| 2010/0115133 A1 | 5/2010 | Joshi | |
| 2010/0121932 A1 | 5/2010 | Joshi et al. | |
| 2010/0153558 A1 | 6/2010 | Kommula | |
| 2010/0223621 A1 | 9/2010 | Joshi | |
| 2010/0251008 A1 | 9/2010 | Swildens | |
| 2010/0293296 A1 | 11/2010 | Hsu et al. | |
| 2010/0299427 A1 | 11/2010 | Joshi | |
| 2011/0099261 A1 | 4/2011 | Joshi | |
| 2011/0122771 A1 | 5/2011 | Joshi | |
| 2011/0191459 A1 | 8/2011 | Joshi | |
| 2011/0264798 A1 | 10/2011 | Joshi | |
| 2012/0096166 A1 | 4/2012 | Devarapalli et al. | |

OTHER PUBLICATIONS

Cisco LocalDirector Version 1.6.3 Release Notes, and Table of Contents for Conference on Telecommunications, Apr. 15-16, 1999.*

AlteonWebSystems, "PCD White Paper," *AlteonWebSystems*, pp. 1-8, Mar. 2001.

Cardellini, V., et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova, Z., et al., "Challenges in URL Switching for Implementing Globally Distributed Web Sites," *IEEE*, pp. 89-94, 2000.

U.S. Appl. No. 09/670,487, Hsu et al., filed Sep. 26, 2000.

U.S. Appl. No. 10/206,580, Kommula et al., filed Jul. 25, 2002.

U.S. Appl. No. 10/214,921, Kommula, filed Aug. 7, 2002.

U.S. Appl. No. 10/305,823, Joshi et al., filed Nov. 27, 2002.

U.S. Appl. No. 10/377,364, Kommula, filed Feb. 28, 2003.

U.S. Appl. No. 10/674,627, Joshi, filed Sep. 29, 2003.

U.S. Appl. No. 10/839,919, Joshi, filed May 6, 2004.

U.S. Appl. No. 10/840,496, Joshi, filed May 6, 2004.

U.S. Appl. No. 10/924,552, Joshi, filed Aug. 23, 2004.

U.S. Appl. No. 11/429,177, Joshi et al., filed May 5, 2006.

Bestavros, Azer, "WWW Traffic Reduction and Load Balancing through Server-Based Caching," *IEEE Concurrency*, pp. 56-67, Jan.-Mar. 1997.

Paul, Arindam et al., "Balancing Web Server Load for Adaptable Video Distribution," *IEEE* pp. 469-476, 2000.

Albitz, P., et al., "DNS and BIND in a Nutshell," O'Reilly & Associates, Sebastopol, CA, 1992, pp. 214-215.

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

(56) References Cited

OTHER PUBLICATIONS

Nortel Networks, "Alteon Personal Content Director," © 2001, can be retrieved from http://www.nortelnetworks.com/personalinternet, 4 pages.

IBM Corp., *IBM WebSphere Performance Pack: Load Balancing with IBM SecureWay Network Dispatcher*, First Edition, Chapters 1, 2, 4, and 8, Oct. 1999.

IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.

U.S. Appl. No. 11/707,697, filed Feb. 16, 2007, entitled "Global Server Load Balancing," inventor: Sunanda L. Kommula et al.

Genova, Z., et al., "Challenges to URL Switching for Implementing Globally Distributed Web Sites," Department of Computer Science and Engineering, University of South Florida, pp. 1-9, Aug. 11, 2000.

Cisco Document, "Configuring the CSS Domain Name Service,", posted on Dec. 2000, Cisco Systems Inc., http://www.ciscosystems.com, pp. 1-13.

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.

Joshi, "Smoothing Algorithm for Round Trip Time (RTT) Measurements," assigned U.S. Appl. No. 12/177,021, filed Jul. 21, 2008.

Final Office Action, mailed Aug. 12, 2010, for U.S. Appl. No. 12/177,021, 6 pages.

Devarapalli et al., U.S. Appl. No. 61/393,796, filed Oct. 15, 2010, 43 pages.

Devarapalli et al., U.S. Appl. No. 12/916,390, filed Oct. 29, 2010, 45 pages.

Joshi, U.S. Appl. No. 12/938,232, filed Nov. 2, 2010, 28 pages.

Non-Final Office Action for U.S. Appl. No. 12/496,560, mailed on Sep. 17, 2010, 27 pages.

Final Office Action for U.S. Appl. No. 12/272,618, mailed on Nov. 26, 2010, 19 pages.

Office Action for U.S. Appl. No. 11/707,697, mailed on Nov. 22, 2010, 24 pages.

Non-Final Office Action for U.S. Appl. No. 12/506,137, mailed on Oct. 7, 2010, 26 pages.

Notice of Allowance for U.S. Appl. No. 12/506,130, mailed on Oct. 12, 2010, 49 pages.

Notice of Allowance for U.S. Appl. No. 12/177,021, mailed Dec. 10, 2010, 20 pages.

Final Office Action for U.S. Appl. No. 10/840,496, mailed on Aug. 1, 2008, 14 pages.

Notice of Allowance for U.S. Appl. No. 10/840,496, mailed on Oct. 15, 2008, 6 pages.

Non-Final Office Action for U.S. Appl. No. 10/924,552, Mailed Feb. 27, 2008, 14 pages.

Notice of Allowance for U.S. Appl. No. 10/924,552, Mailed May 30, 2008, 18 pages.

Non-Final Office Action for U.S. Appl. No. 09/670,487, Mailed Dec. 31, 2003, 22 pages.

Final Office Action for U.S. Appl. No. 09/670,487, Mailed Sep. 21, 2004, 22 pages.

Non-Final Office Action for U.S. Appl. No. 09/670,487, Mailed Mar. 15, 2005, 18 pages.

Final Office Action for U.S. Appl. No. 09/670,487, Mailed Nov. 3, 2005, 17 pages.

Non-Final Office Action for U.S. Appl. No. 09/670,487, Mailed May 3, 2006, 18 pages.

Non-Final Office Action for U.S. Appl. No. 09/670,487, Mailed Nov. 17, 2006, 8 pages.

Final Office Action for U.S. Appl. No. 09/670,487, Mailed Oct. 30, 2007, 9 pages.

Non-Final Office Action for U.S. Appl. No. 09/670,487, Mailed Jul. 22, 2008, 6 pages.

Notice of Allowance for U.S. Appl. No. 09/670,487, Mailed Sep. 18, 2008, 4 pages.

Non-Final Office Action for U.S. Appl. No. 11/741,480, Mailed Nov. 27, 2007, 5 pages.

Non-Final Office Action for U.S. Appl. No. 11/741,480, Mailed Apr. 29, 2008, 6 pages.

Final Office Action for U.S. Appl. No. 11/741,480, Mailed Oct. 31, 2008, 10 pages.

Notice of Allowance for U.S. Appl. No. 11/741,480, Mailed Apr. 10, 2009, 7 pages.

Network Working Group, Request for Comments (RFC) 4033, "DNS Security Introduction and Requirements," Mar. 2005, 22 pages.

Non-Final Office Action for U.S. Appl. No. 11/707,697, Mailed Mar. 3, 2009, 41 pages.

Requirement for Restriction/Election for U.S. Appl. No. 11/707,697, mailed on Sep. 17, 2009, 6 pages.

Notice of Allowance for U.S. Appl. No. 10/377,364, mailed on Jan. 12, 2010, 5 pages.

Final Office Action for U.S. Appl. No. 11/707,697, mailed on Jan. 12, 2010, 22 pages.

Non-Final Office Action for U.S. Appl. No. 12/177,021, mailed Jan. 29, 2010, 8 pages.

Non-Final Office Action for U.S. Appl. No. 12/272,618, mailed on Feb. 4, 2010, 14 pages.

F5 Networks, Inc., "Keeping Up with Multi-Service Applications," A F5 Networks, Inc. White Paper Document, Jan. 2006, 8 pages, Seattle, WA.

Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.

F5 Networks, Inc., "Optimize Application Delivery Across Your Globally Distributed Data Centers," BIG-IP Global Traffic Manager Datasheet, 2009, 8 pages, Seattle WA.

Stalvig P., "Disaster Recovery: Not Just Planning for the Worst," A F5 Networks, Inc. White Paper Document, 2008, 16 pages, F5 Networks, Inc., Seattle, WA.

Cisco Systems, Inc., "The Global Server Load Balancing Primer," A Cisco Systems, Inc. White Paper Document, 1992-2004, 20 pages, San Jose, CA.

Network Working Group, Request for Comments (RFC) 4034, "Resource Records for the DNS Security Extensions," Mar. 2005, 31 pages.

Network Working Group, Request for Comments (RFC) 4035, "Protocol Modifications for the DNS Security Extensions," Mar. 2005, 55 pages.

National Institute of Standards and Technology (NIST), "Secure Domain Name System (DNS) Deployment Guide," Special Publication 800-81, May 2006, 103 pages.

CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.

Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.

Silva, Peter, "DNSSEC: The Antidote to DNS Cache Poisoning and Other DNS Attacks," A F5 Networks, Inc. Technical Brief, 2009, 10 pages, Seattle, WA.

Wikimedia Foundation, Inc., "Domain Name Security Extensions," retrieved Oct. 22, 2010, from http://en.wikipedia.org/wiki/Domain_Name_System_Security_Extensions, 17 pages.

A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.

Civil Action 10-332, Report on the Filing or Determination of an Action Regarding a Patent or Trademark, filed on Aug. 5, 2010, 2 pages.

Yerxa, G., "ACElerate on Fast Track for Load-Balancing," Mar. 8, 1999, retrieved Nov. 5, 2002, from http://www.networkcomputing.com/1005/1005sp2.html, pp. 1-4.

Office Action, issued in U.S. Appl. No. 10/211,822, mailed Aug. 19, 2005.

(56) References Cited

OTHER PUBLICATIONS

Notice of Allowance, issued in U.S. Appl. No. 10/211,822, mailed Mar. 7, 2006.
Office Action, issued in U.S. Appl. No. 10/377,364, mailed Sep. 22, 2006.
Office Action, issued in U.S. Appl. No. 10/377,364, mailed Mar. 26, 2007.
Office Action, issued in U.S. Appl. No. 10/377,364, mailed Sep. 4, 2007.
Office Action, issued in U.S. Appl. No. 10/377,364, mailed Apr. 9, 2008.
Office Action, issued in U.S. Appl. No. 10/377,364, mailed Nov. 24, 2008.
Office Action, issued in U.S. Appl. No. 10/377,364, mailed Aug. 31, 2009.
Advisory Action, issued in U.S. Appl. No. 10/377,364, mailed Nov. 23, 2009.
Office Action, issued in U.S. Appl. No. 10/206,580, mailed Aug. 15, 2005.
Office Action, issued in U.S. Appl. No. 10/206,580, mailed Mar. 9, 2006.
Advisory Action, issued in U.S. Appl. No. 10/206,580, mailed Jun. 6, 2006.
Office Action, issued in U.S. Appl. No. 10/206,580, mailed Jul. 12, 2006.
Notice of Allowance, issued in U.S. Appl. No. 10/206,580, mailed Jan. 11, 2007.
Office Action, issued in U.S. Appl. No. 10/376,903, mailed Jul. 17, 2006.
Office Action, issued in U.S. Appl. No. 10/376,903, mailed Jan. 12, 2007.
Office Action, issued in U.S. Appl. No. 10/376,903, mailed Jun. 5, 2007.
Office Action, issued in U.S. Appl. No. 10/376,903, mailed Feb. 20, 2008.
Office Action, issued in U.S. Appl. No. 10/376,903, mailed Oct. 16, 2008.
Office Action, issued in U.S. Appl. No. 10/376,903, mailed Mar. 4, 2009.
Office Action, issued in U.S. Appl. No. 10/214,921, mailed Feb. 7, 2006.
Office Action, issued in U.S. Appl. No. 10/214,921, mailed Aug. 9, 2006.
Advisory Action, issued in U.S. Appl. No. 10/214,921, mailed Sep. 21, 2006.
Office Action, issued in U.S. Appl. No. 10/214,921, mailed Dec. 7, 2006.
Office Action, issued in U.S. Appl. No. 10/214,921, mailed Aug. 13, 2007.
Office Action, issued in U.S. Appl. No. 10/214,921, mailed Nov. 15, 2007.
Office Action, issued in U.S. Appl. No. 10/214,921, mailed Jun. 12, 2008.
Office Action, issued in U.S. Appl. No. 10/214,921, mailed Oct. 6, 2008.
Notice of Allowance, issued in U.S. Appl. No. 10/214,921, mailed Apr. 3, 2009.
Office Action, issued in U.S. Appl. No. 10/305,823, mailed Jan. 12, 2006.
Office Action, issued in U.S. Appl. No. 10/305,823, mailed Jul. 3, 2006.
Office Action, issued in U.S. Appl. No. 10/305,823, mailed Jan. 3, 2007.
Office Action, issued in U.S. Appl. No. 10/305,823, mailed Sep. 10, 2007.
Office Action, issued in U.S. Appl. No. 10/305,823, mailed Mar. 24, 2008.
Advisory Action, issued in U.S. Appl. No. 10/305,823, mailed Jul. 9, 2008.
Examiner's Answer, issued in U.S. Appl. No. 10/305,823, mailed Mar. 4, 2009.
Supplemental Examiner's Answer, issued in U.S. Appl. No. 10/305,823, mailed Apr. 13, 2009.
Office Action, issued in U.S. Appl. No. 10/674,627, mailed Jun. 5, 2006.
Office Action, issued in U.S. Appl. No. 10/674,627, mailed Nov. 3, 2006.
Office Action, issued in U.S. Appl. No. 10/674,627, mailed Jul. 30, 2007.
Office Action, issued in U.S. Appl. No. 10/674,627, mailed Apr. 11, 2008.
Office Action, issued in U.S. Appl. No. 10/674,627, mailed Dec. 23, 2008.
Office Action, issued in U.S. Appl. No. 10/674,627, mailed Aug. 3, 2009.
Advisory Action, issued in U.S. Appl. No. 10/674,627, mailed Oct. 16, 2009.
Notice of Allowance, issued in U.S. Appl. No. 10/839,919, mailed Mar. 5, 2008.
Office Action, issued in U.S. Appl. No. 10/839,919, mailed Jun. 18, 2008.
Office Action, issued in U.S. Appl. No. 10/839,919, mailed Dec. 9, 2008.
Notice of Allowance, issued in U.S. Appl. No. 10/839,919, mailed May 14, 2009.
Office Action, issued in U.S. Appl. No. 10/840,496, mailed Oct. 18, 2007.
Civil Action 10-332, Notice of Voluntary Dismissal Without Prejudice, filed on Aug. 5, 2010, 2 pages.
Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.
Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.
U.S. Appl. No. 11/741,480, filed Apr. 27, 2007, Hsu et al.
U.S. Appl. No. 12/272,618, filed Nov. 17, 2008, Hsu et al.
U.S. Appl. No. 12/353,701, filed Jan. 14, 2009, Joshi.
Doeringer et al., "Routing on Longest-Matching Prefixes," IEEE/ACM Transactions on Networking, vol. 4, No. 1, Feb. 1996, pp. 86-97.
Non-Final Office Action, mailed on Sep. 29, 2009, for U.S. Appl. No. 12/272,618, 16 pages.
Notice of Allowance, mailed Jul. 6, 2007, for U.S. Appl. No. 10/206,580, 5 pages.
Notice of Allowance, mailed on Oct. 19, 2009, for U.S. Appl. No. 10/376,903, 4 pages.
Notice of Allowance, mailed on Aug. 19, 2010, for U.S. Appl. No. 10/674,627, 4 pages.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
Action Closing Prosecution, for Reexamination Control No. 95/001,812, mailed Jun. 2, 2012, 49 pages.
Joshi et al., U.S. Appl. No. 13/229,380, filed Sep. 9, 2011.
Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.

(56) References Cited

OTHER PUBLICATIONS

Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.
Civil Action CV10-03428, Answer to Third Amended Complaint, Affirmative Defenses, and Counterclaims, filed on May 16, 2011, 40 pages.
Civil Action CV10-03428, Answer to Defendant A10 Networks, Inc.'s Counterclaims, and Counterclaim, filed on May 27, 2011, 12 pages.
Delgadillo, K., "Cisco Distributed Director," Cisco White Paper, 1999, 19 pages.
Table of Contents for 2nd Conference on Telecommunications (ConfTele'99), Apr. 15-16, 1999, 9 pages.
Bernardo, L et al., "Scalability Issues in Telecommunication Services," In Proceedings of 2nd Conference on Telecommunications (ConfTele'99), Apr. 15-16, 1999, pp. 409-413.
Lin, "VPN Tunnel Balancer," U.S. Appl. No. 60/169,502, filed Dec. 7, 1999, 7 pages.
Cisco Systems, Inc, "Cisco LocalDirector Version 1.6.3 Release Notes," Oct. 1997, 52 pages, San Jose, CA.
Foundry Networks, Inc., "Foundry ServerIron Installation and Configuration Guide," May 2000, 784 pages.
Dell Computer Corporation, "3-DNS Reference Guide, Version 4.2," 2002, 261 pages.
Schemers III, "Ibnamed: A Load Balancing Name Server in Perl," 1995 LISA IX, Sep. 17-22, 1995, Monterey, CA, 13 pages.
Goldszmidt, "Load Distribution for Scalable Web Servers: Summer Olympics 1996," In Proceedings of the 8th IFIP/IEEE International Workshop on Distributed Systems: Operations and Management, Sydney, Australia, Oct. 1997, 10 pages.
"Use F5 Networks' 3DNS Controller to Supercharge Standard DNS Capabilities," Jul. 1999, F5 White Paper, Seattle, WA.
Buyya, "High Performance Cluster Computing: Architectures and Systems," vol. 1, copyright 1999, Prentice Hall PTR, Upper Saddle River, New Jersey 07458, http://www.phptr.com.
Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.
Civil Action CV10-03428—Notice of Granted Requests for Reexamination of Patents 7,547,508 and 7,270,977, Filed Aug. 1, 2011, 31 pages, including Exhibits A and B.
Civil Action CV10-03428—Notice of Granted Requests for Reexamination of Patents 7,558,195, 7,657,629, 7,840,678, Filed Aug. 5, 2011, 316 pages.
Civil Action CV10-03428—Notice of Granted Requests for Reexamination of Patent 7,584,301, Filed Aug. 12, 2011, 14 pages, including Exhibit A.
Civil Action CV10-03428—Joint Claim Construction, Filed Aug. 26, 2011, 29 pages.
Civil Action CV10-03428—Notice of Granted Requests for Reexamination of Patents 7,774,833; 7,454,500; 7,899,899; 7,754,965; 7,647,427; and 7,716,370, Filed Sep. 6, 2011, 72 pages, including Exhibits A through F.
Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Filed Jun. 27, 2011, 779 pages, Including Exhibits A through M.
Skene et al., "Method and System for Balancing Load Distribution on a Wide Area Network," U.S. Appl. No. 09/459,815, filed Dec. 13, 1999, 59 pages.
Skene et al., "Method and System for Name Server Load Balancing," U.S. Appl. No. 60/182,812, filed Feb. 16, 2000, 16 pages.
Tsimelzon et al., "Java application framework for an internet content delivery network," U.S. Appl. No. 60/347,481, filed Jan. 11, 2002, 26 pages.
"Foundry Networks Announces Application Aware Layer 7 Switching on ServerIron Platform," Mar. 1999, 4 pages.
Civil Action CV10-03428, Order Construing Disputed Claim Terms of U.S. Patent Nos. 7,647,427; 7,716,370; 7,558,195; 7,454,500; 7,581,009; 7,657,629; 7,584,301; 7,840,678; and 5,875,185, issued Jan. 6, 2012, 33 pages.
Information Disclosure Statement filed on Apr. 4, 2004, for U.S. Patent No. 7,308,475, 5 pages.
Release Note: 3-DNS Controller, version 4.5, Mar. 5, 2007, 19 pages.
F5 Networks' Newest Wide Area Traffic Management Solution Enables Enterprises to Meet Global e-Business Objectives, Business Wire, Feb. 19, 2002, 4 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC10), 2010, 7 pages.
Request for Reexamination of U.S. Patent No. 7,454,500, filed Jun. 27, 2011, 29 pages.
Notice of Reexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Order Granting Request for Reexamination of U.S. Patent No. 7,454,500, mailed Aug. 12, 2011, Reexamination Control No. 90/011,772, 11 pages.
Office Action for Reexamination Control No. 90/011,772, mailed Oct. 13, 2011, 8 pages.
Decision on Petition for Extension of Time in Reexamination (Granted), mailed Nov. 17, 2011, Reexamination Control No. 90/011,772, 3 pages.
Ex Parte Reexamination Interview Summary for Reexamination Control No. 90/011,772, mailed on Nov. 29, 2011, 58 pages.
Ex Parte Reexamination Interview Summary for Reexamination Control No. 90/011,772, mailed on Apr. 10, 2012, 3 pages.
Final Office Action for Reexamination Control No. 90/011,772, mailed May 17, 2012, 53 pages.
Request for Inter Partes Reexamination of U.S. Patent No. 7,454,500, filed Nov. 4, 2011, 157 pages.
Notice of Assignment of Inter Partes Reexamination Request and Notice of Reexamination Request Filing Date, mailed Nov. 18, 2011, Reexamination Control No. 95/001,806, 2 pages.
Order Granting Request for Inter Partes Reexamination of U.S. Patent No. 7,454,500 and Office Action for Reexamination Control No. 95/001,806, mailed Dec. 16, 2011, 43 pages.
Third Party Requester's Opposition to Petition to Vacate, for Reexamination Control No. 95/001,806, filed Mar. 1, 2012, 15 pages.
Third Party Requester's Opposition to Petition to Suspend Reexamination for Reexamination Control No. 95/001,806, filed Mar. 2, 2012, 14 pages.
Third Party Requester's Comments under 35 U.S.C. § 314(B)(2) and 37 C.F.R. § 1.947, for Reexamination Control No. 95/001,806, filed Mar. 19, 2012, 36 pages.
Third Party Requester's Opposition to Patent Owner's Petition to "Supplement," for Reexamination Control No. 95/001,806, filed Apr. 19, 2012, 21 pages.
Terminal Disclaimer for U.S. Appl. No. 11/741,480, filed Jan. 29, 2008, 1 page.
Civil Action 10-332—*Brocade Communication Systems, Inc. v. A10 Networks, Inc.*—Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.

(56) References Cited

OTHER PUBLICATIONS

Civil Action CV10-03428—Defendant, David Cheung's Answer to Plaintiffs First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum in Support of Motion for Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiff's Motion for TRO and Preliminary Injunction filed by Brocade Communications Systems, Inc., Foundry Networks, LLC, filed Jul. 26, 2011, 2 pages.
Civil Action CV10-03428—Declaration of Keith Stuart in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiff's Motion for TRO and Preliminary Injunction filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiff's Motion for TRO and Preliminary Injunction filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiff's Motion for TRO and Preliminary Injunction filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiff's Motion for TRO and Preliminary Injunction filed by Brocade Communications Systems, Inc., Foundry Networks, LLC, filed Jul. 26, 2011, 46 pages. Included: Redacted Exhibits 1 through 8.
Civil Action CV10-03428—Declaration of Lisa McGill in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 506 pagse. Included: Exhibits 1 through 30. (due to size, this references will be submitted in three parts).
Civil Action CV10-03428—Plaintiffs' Reply Memorandum in Further Support of Motion for Temporary Restraining Order and Preliminary Injunction[Redacted Version] filed by Brocade Communications Systems, Inc., Foundry Networks, LLC, filed Aug. 4, 2011, 22 pages.
Civil Action CV10-03428—Notice of Errata re Reply Memorandum in Further Support of Motion for Temporary Restraining Order and Preliminary Injunction, filed by Brocade Communications Systems, Inc., Foundry Networks, LLC, filed Aug. 5, 2011, 2 pages.
Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.
Civil Action CV10-03428—Order Denying Motion for Temporary Restraining Order [Redacted Version] of Plaintiffs' Memorandum in Support of Motion for Temporary Restraining Order and Preliminary Injunction, filed by Brocade Communications Systems, Inc., Foundry Networks, LLC, filed Aug. 16, 2011, 5 pages.
Civil Action CV10-03428—Notice of Granted Request for Reexamination of U.S. Patent No. 7,581,009, filed Sep. 27, 2011, 18 pages.
Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.
Civil Action CV10-03428—Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.
Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.
Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.
Civil Action CV10-03428—Initial Claim Construction Brief, filed by Brocade Communications Systems, Inc., Foundry Networks, LLC, filed Oct. 11, 2011, 31 pages.
Civil Action CV10-03428—Declaration of Nitin Gambhir of Brocade Communications Systems, Inc. and Foundry Networks, LLC's Motion for Summary Judgment of Infringement of U.S. Patent Nos.

(56) References Cited

OTHER PUBLICATIONS 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.
Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.
Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.
Civil Action CV10-03428—Declaration of Nitin Gambhir in Support of Brocade Communications, Inc. and Foundry Networks, LLCs Motion for Summary Judgment of Infringement of U.S. Patent Nos. 7,454,500; 7,581,009; 7,657,629; 7,584,301; and 7,840,678, filed by Brocade Communications Systems, Inc., Foundry Networks, LLC, filed Oct. 21, 2011, 162 pages.
Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.
Civil Action CV10-03428—Responsive Claim-Construction Brief (PLR 4-5(b)) by A10 Networks, Inc., Lee Chen, Rajkumar Jalan, filed Nov. 15, 2011, 28 pages.
Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.
Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.
Civil Action CV10-03428—Opposition re Motion for Summary Judgment of Noninfringement of U.S. Patent No. 5,875,185; Motion for Partial Summary Judgment of U.S. Patent Nos. 7,454,500; 7,581,009; 7,657,629; 7,584,301; and 7,840,678, filed by A10 Networks, Inc., Lee Chen, Rajkumar Jalan, filed Nov. 15, 2011, 20 pages.
Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. and Foundry Networks, LLCs Motion for Partial Summary Judgment of U.S. Patent Nos. 7,454,500; 7,581,009; 7,657,629; 7,584,301; and 7,840,678 filed by A10 Networks, Inc., Lee Chen, Rajkumar Jalan, filed Nov. 15, 2011, 16 pages.
Civil Action CV10-03428—Administrative Motion to Consider Whether Cases Should be Related, filed by Brocade Communications Systems, Inc., Foundry Networks, LLC, filed Nov. 21, 2011, 8 pages. Included: Declaration and Proposed Order.
Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.
Civil Action CV10-03428—Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Civil Action CV10-03428—Declaration of Scott A. Herbst Declaration of Scott A. Herbst in Support of Defendant and Counterclaimant A10 Networks, Inc.s and Defendants Lee Chens, Rajkumar Jalans, Ron Szetos, and Steve Hwangs Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 25 pages. Included: Exhibits 1 through 6.
Civil Action CV10-03428—Litigation Docket, printed on Nov. 26, 2011, 2011, 44 pages.
Civil Action CV10-03428—Stipulation Regarding Plaintiffs' Motion for Partial Summary Judgment of Assignor Estoppel, filed Nov. 30, 2011, 2 pages.
Civil Action CV10-03428—Brocades Opposition to Defendant's Motion to Stay Proceedings Pending Reexaminations, filed Dec. 7, 2011, 18 pages.
Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.
Civil Action CV10-03428—Defendant and Counterclaimant A10 Networks, Inc.'s Notice of Granted Requests for Inter Partes Reexamination of Plaintiffs' U.S. Patent Nos. 7,558,195; 7,454,500; 7,574,508; and 7,720,977, filed Dec. 28, 2011, 3 pages.
Civil Action CV10-03428—Defendant and Counterclaimant A10 Networks, Inc.'s Notice of Granted Request for Inter Partes Reexamination of Plaintiffs' U.S. Patent No. 7,581,301, filed Dec. 29, 2011, 3 pages.
Civil Action CV10-03428—Defendant and Counterclaimant A10 Networks, Inc.'s Notice of Granted Request for Inter Partes Reexamination of Plaintiffs' U.S. Patent Nos. 7,657,629 and 7,840,678, filed Jan. 20, 2012, 3 pages.
Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent Nos. 7,774,833; 7,647,427; 7,716,370; 7,581,009); and (ii) Status Updated for Eleven Already-Instituted Reexaminations (U.S. Patent Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 3 pages.
Civil Action CV10-03428—Defendant and Counterclaimant A10 Networks, Inc.'s Notice of Granted Request for Inter Partes Reexamination of Plaintiffs' U.S. Patent No. 7,756,965 and Status Update, filed Feb. 16, 2012, 3 pages.
Ex Parte Interview Summary for Reexamination Control No. 90/011,765, Jul. 6, 2011, 3 pages.
Order Granting Request for Reexamination of U.S. Patent No. 7,584,301, mailed Aug. 8, 2011, Reexamination Control No. 90/011,765, 10 pages.
Office Action in Ex Parte Reexamination for Control No. 90/011,765, mailed on Oct. 13, 2011, 7 pages.
Ex Parte Reexamination Interview Summary for Reexamination Control No. 90/011,765, mailed on Nov. 29, 2011, 57 pages.
Decision on Petition for Extension of Time in Reexamination (Granted), mailed Dec. 9, 2011, Reexamination Control No. 90/011,765, 3 pages.
Final Office Action for Reexamination Control No. 90/011,765, mailed May 16, 2012, 59 pages.
Request for Inter Partes Reexamination of U.S. Patent No. 7,584,301, filed Nov. 8, 2011, 194 pages.
Notice of Inter Partes Reexamination Request Filing Date and Notice of Assignment of Inter Partes Reexamination Request, mailed Nov. 21, 2011, Reexamination Control No. 95/001,812, 2 pages.
Order Granting Request for Inter Partes Reexamination of U.S. Patent No. 7,584,301 and Office Action for Reexamination Control No. 95/001,812, mailed Dec. 28, 2011, 25 pages.

(56) References Cited

OTHER PUBLICATIONS

Third Party Requester's Comments under 35 U.S.C. § 314(B)(2) and 37 C.F.R. § 1.947, for Reexamination Control No. 95/001,812, filed Mar. 29, 2012, 33 pages.
Request for Reexamination of U.S. Patent No. 7,840,678, filed Jun. 27, 2011, 25 pages.
Notice of Reexamination Request Filing Date and Notice of Assignment of Reexamination Request, amiled Jul. 1, 2011, Reexamination Control No. 90/011,763, 2 pages.
Ex Parte Interview Summary for Reexamination Control No. 90/011,763, mailed Jul. 5, 2011, 3 pages.
Order Granting Request for Reexamination of U.S. Patent No. 7,840,678, mailed Jul. 29, 2011, Reexamination Control No. 90/011,763, 10 pages.
Office Action for Reexamination Control No. 90/011,763, mailed Oct. 4, 2011, 7 pages.
Decision on Petition for Extension of Time in Reexamination (Granted), mailed Nov. 17, 2011, Reexamination Control No. 90/011,763, 3 pages.
Ex Parte Reexamination Interview Summary for Reexamination Control No. 90/011,763, mailed on Nov. 29, 2011, 57 pages.
Final Office Action for Reexamination Control No. 90/011,763, mailed on Apr. 25, 2012, 51 pages.
Request for Inter Partes Reexamination for U.S. Patent No. 7,840,678, mailed on Nov. 17, 2011, 164 pages.
Notice of Inter Partes Reexamination Request Filing Date and Notice of Assignment of Inter Partes Reexamination Request, mailed Nov. 23, 2011, Reexamination Control No. 95/001,822, 2 pages.
Order Granting Request for Inter Partes Reexamination of U.S. Patent No. 7,840,678 and Office Action for Reexamination Control No. 95/001,822, mailed Jan. 12, 2012, 21 pages.
Third Party Requester's Comments under 35 U.S.C. § 314(B)(2) and 37 C.F.R. § 1.947, for Reexamination Control No. 95/001,822, filed Apr. 11, 2012, 37 pages.
Action Closing Prosecution, for Reexamination Control No. 951001,822, mailed May 5, 2012, 45 pages.
Notice of Allowance for U.S. Appl. No. 12/938,232, mailed on Apr. 7, 2011, 51 pages.
Non-Final Office Action for U.S. Appl. No. 13/101,398, mailed on Nov. 10, 2011, 58 pages.
Request for Reexamination of U.S. Patent No. 7,756,965, filed Jun. 27, 2011, 38 pages.
Ex Parte Interview Summary for Reexamination Control No. 90/011,761, mailed Jul. 6, 2011, 3 pages.
Office Action for Reexamination Control No. 90/011,761, mailed Nov. 18, 2011, 12 pages.
Final Office Action and Interview Summary for Reexamination Control No. 90/011,761, mailed on Mar. 26, 2012, 17 pages.
Notice of Inter Partes Reexamination Request Filing Date and Notice of Assignment of Inter Partes Reexamination Request, maield Dec. 1, 2011, Reexamination Control No. 95/001,827, 2 pages.
Order Granting Request for Inter Partes Reexamination of U.S. Patent No. 7,756,965, mailed Feb. 13, 2012, Reexamination Control No. 95/001,827, 18 pages.
Request for Reexamination of U.S. Patent No. 7,899,899, filed Jun. 27, 2011, 24 pages.
Request for Reexamination of U.S. Patent No. 7,581,009, filed Jun. 27, 2011, 58 pages.
Notice of Reexamination Request Filing Date and Notice of Assignment of Reexamination Request, mailed Jul. 8, 2011, Reexamination Control No. 90/011,770, 2 pages.
Ex Parte Reexamination Interview Summary, for Reexamination Control No. 90/011,770, mailed Jul. 18, 2011, 2 pages.
Order Granting Request for Reexamination of U.S. Patent No. 7,581,009, mailed Sep. 21, 2011, Reexamination Control No. 90/011,770, 14 pages.
Office Action for Reexamination Control No. 90/011,770, mailed Feb. 16, 2012, 35 pages.
Ex Parte Reexamination Interview Summary, for Reexamination Control No. 90/011,770, mailed Mar. 27, 2012, 3 pages.

Decision on Petition for Extension of Time in Reexamination (Granted), mailed Mar. 28, 2012, Reexamination Control No. 90/011,770, 3 pages.
Request for Inter Partes Reexamination of U.S. Patent No. 7,581,009, filed Nov. 4, 2011, 197 pages.
Notice of Assignment of Inter Partes Reexamination Request and Notice of Reexamination Request Filing Date, mailed Nov. 10, 2011, Reexamination Control No. 95/001,807, 2 pages.
Order Granting Request for Inter Partes Reexamination of U.S. Patent No. 7,581,009 and Office Action for Reexamination Control No. 95/001,807, mailed Jan. 31, 2012, 23 pages.
Decision on Petition for Extension of Time in Reexamination (Granted), mailed Mar. 30, 2012, Reexamination Control No. 95/001,807, 3 pages.
Third Party Requester's Opposition to Petition to Vacate, for Reexamination Control No. 95/001,807, filed Apr. 16, 2012, 17 pages.
Final Office Action for U.S. Appl. No. 12/496,560, mailed on Jan. 28, 2011, 10 pages.
Notice of Allowance for U.S. Appl. No. 12/496,560, mailed on May 16, 2011, 11 pages.
Office Communication for U.S. Appl. No. 12/496,560, mailed on Jun. 14, 2011, 5 pages.
Non-Final Office Action for U.S. Appl. No. 12/272,618, mailed on Jun. 14, 2011, 13 pages.
Final Office Action for U.S. Appl. No. 12/272,618, mailed on Feb. 28, 2012, 12 pages.
Non-Final Office Action for U.S. Appl. No. 11/429,177, mailed May 19, 2011, 87 pages.
Non-Final Office Action for U.S. Appl. No. 11/429,177, mailed Oct. 18, 2011, 25 pages.
Request for Reexamination of U.S. Patent No. 7,657,629, filed Jun. 27, 2011, 36 pages.
Notice of Reexamination Request Filing Date and Notice of Assignment of Reexamination Request, mailed Jul. 7, 2011, Reexamination Control No. 90/011,766, 2 pages.
Ex Parte Interview Summary for Reexamination Control No. 90/011,766, Jul. 14, 2011, 3 pages.
Order Granting Request for Reexamination of U.S. Patent No. 7,657,629, mailed Jul. 30, 2011, Reexamination Control No. 90/011,766, 10 pages.
Office Action for Reexamination Control No. 90/011,766, mailed on Oct. 4, 2011, 7 pages.
Ex Parte Reexamination Interview Summary for Reexamination Control No. 90/011,766, mailed on Nov. 29, 2011, 57 pages.
Decision on Petition for Extension of Time in Reexamination (Granted), mailed Dec. 2, 2011, Reexamination Control No. 90/011,766, 3 pages.
Request for Inter Partes Reexamination for U.S. Patent No. 7,657,629 Bl, filed Nov. 17, 2011, 238 pages.
Notice of Inter Partes Reexamination Request Filing Date and Notice of Assignment of Inter Partes Reexamination Request, mailed Dec. 5, 2011, Reexamination Control No. 95/001,824, 2 pages.
Order Granting Request for Inter Partes Reexamination of U.S. Patent No. 7,657,629 and Office Action for Reexamination Control No. 95/001,824, mailed Jan. 12, 2012, 33 pages.
Third Party Requester's Comments under 35 U.S.C. § 314(B)(2) and 37 C.F.R. § 1.947, for Reexamination Control No. 95/001,824, filed Apr. 11, 2012, 21 pages.
Final Office Action for U.S. Appl. No. 11/707,697, mailed on Apr. 20, 2011, 10 pages.
Notice of Allowance for U.S. Appl. No. 11/707,697, mailed on Aug. 5, 2011, 9 pages.
Notice of Allowance for U.S. Appl. No. 11/707,697, mailed Aug. 12, 2011, 6 pages.
Request for Reexamination of U.S. Patent No. 7,574,508, filed Jun. 27, 2011, 21 pages.
Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.

(56) References Cited

OTHER PUBLICATIONS

Order Granting Request for Reexamination of U.S. Patent No. 7,574,508, mailed Jul. 22, 2011, Reexamination Control No. 90/011,764, 15 pages.
Office Action for Reexamination Control No. 90/011,764, mailed on Nov. 14, 2011, 18 pages.
Office Action for Reexamination Control No. 90/011,764, mailed on Nov. 18, 2011, 18 pages.
Decision on Petition for Extension of Time in Reexamination (Granted), mailed Jan. 3, 2012, Reexamination Control No. 90/011,764, 3 pages.
Ex Parte Reexamination Interview Summary for Reexamination Control No. 90/011,764, mailed on Jan. 6, 2012, 52 pages.
Request for Inter Partes Reexamination of U.S. Patent No. 7,574,508, filed Nov. 4, 2011, 70 pages.
Notice of Inter Partes Reexamination Request Filing Date and Notice of Assignment of Inter Partes Reexamination Request, mailed Nov. 8, 2011, Reexamination Control No. 95/001,804, 2 pages.
Order Granting Request for Inter Partes Reexamination of U.S. Patent No. 7,574,508 and Office Action for Reexamination Control No. 95/001,804, mailed Dec. 8, 2011, 20 pages.
Third Party Requester's Comments under 35 U.S.C. § 314(B)(2) and 37 C.F.R. § 1.947, with Exhibits A-E, for Reexamination Control No. 95/001,804, filed Mar. 9, 2012, 79 pages.
Non-Final Office Action for U.S. Appl. No. 12/506,137, mailed on Nov. 23, 2011, 63 pages.
Decision on Appeal for U.S. Appl. No. 10/305,823, mailed on Jul. 11, 2011, 10 pages.
Decision on Request for Rehearing for U.S. Appl. No. 10/305,823, mailed on Nov. 1, 2011, 5 pages.
Request for Reexamination of U.S. Patent No. 7,584,301, filed Jun. 27, 2011, 36 pages.
Notice of Reexamination Request Filing Date and Notice of Assignment of Reexamination Request, mailed Jul. 6, 2011, Reexamination Control No. 90/011,765, 2 pages.
Final Office Action for U.S. Appl. No. 10/840,496, mailed on Aug. 1, 2008, 20 pages.
Notice of Allowance for U.S. Appl. No. 10/840,496, mailed on Oct. 15, 2008, 44 pages.
Non-Final Office Action for U.S. Appl. No. 12/353,701, mailed on Nov. 4, 2009, 22 pages.
Notice of Allowance for U.S. Appl. No. 12/353,701, mailed on Apr. 9, 2010, 15 pages.
Request for Reexamination of U.S. Patent No. 7,756,965, filed Jun. 27, 2011, 57 pages.
Notice of Reexamination Request Filing Date and Notice of Assignment of Reexamination Request, mailed Jun. 30, 2011, Reexamination Control No. 90/011,761, 2 pages.
Ex Parte Interview Summary for Reexamination Control No. 90/011,761, mailed Jul. 6, 2011, 2 pages.
Order Granting Request for Reexamination of U.S. Patent No. 7,756,965, mailed Aug. 19, 2011, Reexamination Control No. 90/011,761, 9 pages.
Office Action for Reexamination Control No. 90/011,761, mailed Nov. 18, 2011, 13 pages.
Decision on Petition for Extension of Time in Reexamination (Granted), mailed Jan. 3, 2012, Reexamination Control No. 90/011,761, 3 pages.
Final Office Action with Interview Summary for Reexamination Control No. 90/011,761, mailed on Mar. 26, 2012, 17 pages.
Advisory Action for Reexamination Control No. 90/011,761, mailed on Jul. 17, 2012, 11 pages.
Notification of Non-Compliant Appeal Brief, for Reexamination Control No. 90/011,761, mailed on Oct. 24, 2012, 4 pages.
Request for Inter Partes Reexamination for U.S. Patent No. 7,756,965 B1, filed Nov. 18, 2011, 189 pages.
Notice of Inter Partes Reexamination Request Filing Date and Notice of Assignment of Inter Partes Reexamination Request, mailed Dec. 1, 2011, Reexamination Control No. 95/001,827, 2 pages.

Order Granting Request for Inter Partes Reexamination of U.S. Patent No. 7,756,965 and Office Action, mailed Feb. 13, 2012, Reexamination Control No. 95/001,827, 18 pages.
Decision on Petition for Extension of Time in Reexamination (Granted), mailed Mar. 30, 2012, Reexamination Control No. 95/001,827, 3 pages.
Third Party Requesters Comments under 35 U.S.C. § 314(B)(2) and 37 C.F.R. § 1.947, for Reexamination Control No. 95/001,827, filed Jun. 13, 2012, 37 pages.
Third Party Requesters Refiling of Certificate of Service for Requester Comments, for Reexamination Control No. 95/001,827, filed Jun. 21, 2012, 3 pages.
Third Party Requesters Opposition to Petition to Refuse Entry of Requesters Comments, for Reexamination Control No. 95/001,827, filed Jul. 12, 2012, 5 pages.
Decision Dismissing Petitions, for Reexamination Control No. 95/001,827, mailed Aug. 22, 2012, 5 pages.
Notice of Allowance for U.S. Appl. No. 12/787,779, mailed Dec. 20, 2010, 45 pages.
Notice of Allowance for U.S. Appl. No. 12/787,779, mailed Jan. 12, 2011, 48 pages.
Request for Reexamination of U.S. Patent No. 7,899,899, filed Jun. 27, 2011, 23 pages.
Notice of Reexamination Request Filing Date and Notice of Assignment of Reexamination Request, mailed Jul. 8, 2011, Reexamination Control No. 90/011,760, 2 pages.
Ex Parte Interview Summary for Reexamination Control No. 90/011,760, mailed Jul. 18, 2011, 3 pages.
Order Granting Request for Reexamination of U.S. Patent No. 7,899,899, mailed Aug. 19, 2011, Reexamination Control No. 90/011,760, 9 pages.
Office Action for Reexamination Control No. 90/011,760, mailed Nov. 18, 2011, 8 pages.
Decision on Petition for Extension of Time in Reexamination (Granted), mailed Jan. 5, 2012, Reexamination Control No. 90/011,760, 3 pages.
Final Office Action and Interview Summary for Reexamination Control No. 90/011,760, mailed Mar. 21, 2012, 14 pages.
Advisory Action for Reexamination Control No. 90/011,760, mailed Jul. 17, 2012, 11 pages.
Request for Inter Partes Reexamination for U.S. Patent No. 7,899,899 B1, filed Nov. 18, 2011, 153 pages.
Notice of Inter Partes Reexamination Request Filing Date and Notice of Assignment of Inter Partes Reexamination Request, mailed Nov. 29, 2011, Reexamination Control No. 95/001,826, 2 pages.
Order Granting Request for Inter Partes Reexamination of U.S. Patent No. 7,899,899 and Office Action for Reexamination Control No. 95/001,826, mailed Feb. 7, 2012, 19 pages.
Decision on Petition for Extension of Time in Reexamination (Granted), mailed Apr. 4, 2012, Reexamination Control No. 95/001,826, 3 pages.
Third Party Requesters Comments under 35 U.S.C. § 314(B)(2) and 37 C.F.R. § 1.947, for Reexamination Control No. 95/001,826, filed Jun. 6, 2012, 46 pages.
Third Party Requesters Refiling of Certificate of Service for Requester Comments, for Reexamination Control No. 95/001,826, filed Jun. 21, 2012, 3 pages.
Third Party Requesters Opposition to Petition to Refuse Entry of Requesters Comments, for Reexamination Control No. 95/001,826, filed Jul. 12, 2012, 5 pages.
Decision Dismissing Petitions, for Reexamination Control No. 95/001,826, mailed Aug. 22, 2012, 5 pages.
Non-Final Office Action for U.S. Appl. No. 13/023,292, mailed Jul. 8, 2011, 6 pages.
Notice of Allowance for U.S. Appl. No. 13/023,292, mailed Feb. 13, 2012, 85 pages.
Office Communication for U.S. Appl. No. 13/023,292, mailed Feb. 23, 2012, 11 pages.
Notice of Allowance for U.S. Appl. No. 13/023,292, mailed May 18, 2012, 25 pages.
Notice of Allowance for U.S. Appl. No. 13/023,292, mailed Jun. 4, 2012, 22 pages.

(56) References Cited

OTHER PUBLICATIONS

Office Communication for U.S. Appl. No. 13/023,292, mailed Jul. 2, 2012, 7 pages.
Office Communication for U.S. Appl. No. 13/023,292, mailed Aug. 24, 2012, 8 pages.
Non-Final Office Action for U.S. Appl. No. 13/595,952, mailed Nov. 13, 2012, 127 pages.
Non-Final Office Action for U.S. Appl. No. 10/924,552, Mailed Feb. 27, 2008, 30 pages.
Notice of Allowance for U.S. Appl. No. 10/924,552, Mailed May 30, 2008, 20 pages.
Non-Final Office Action for U.S. Appl. No. 12/177,021, mailed Jan. 29, 2010, 16 pages.
Final Office Action for U.S. Appl. No. 12/177,021, mailed Aug. 12, 2010, 20 pages.
Notice of Allowance for U.S. Appl. No. 12/177,021, mailed Dec. 10, 2010, 16 pages.
Non-Final Office Action for U.S. Appl. No. 13/008,321, mailed Nov. 20, 2012, 96 pages.
Non-Final Office Action for U.S. Appl. No. 12/916,390, mailed on Jul. 30, 2012, 50 pages.
Civil Action CV10-03428, Expert Report of J. Douglas Tygar in Support of Defendant and Counterclaimant A10 Networks, Inc.'s, and Defendant Lee Chen's and Rajkumar Jalan's Invalidity Contentions, filed Mar. 23, 2012, 81 pages.
Civil Action CV10-03428, Transcript of the Deposition of Kevin Delgadillo, taken Mar. 14, 2012, 12 pages.
Delgadillo, K., "Cisco DistributedDirector," posted Apr. 12, 1999, submitted as Exhibit 2 in *Brocade Communications Systems, Inc.* v. *A10 Networks, Inc.,* Civil Action CV10-03428, Mar. 21, 2012, 27 pages.
Delgadillo, K., "Cisco DistributedDirector," 1999, submitted as Exhibit 3 in *Brocade Communications Systems, Inc.* v. *A10 Networks, Inc.,* Civil Action CV10-03428, Mar. 21, 2012, 20 pages.
Declaration of James E. Mrose, entered as Exhibit 4 in *Brocade Communications Systems, Inc.* v. *A10 Networks, Inc.,* Civil Action CV10-03428, Mar. 21, 2012, 4 pages.
Information Disclosure Statement, filed Jul. 27, 1999 in the prosecution of U.S. Appl. No. 09/294,837, submitted as Exhibit A to the Mrose Declaration, 7 pages.
S. Ariyapperuma et al., "Security Vulnerabilities in DNS and DNS-SEC," Second International Conference on Availability, Reliability and Security (ARES '07), Apr. 2007, 8 pages.
Cisco Systems, Inc., "Configuring a DRP Server Agent," Jul. 6, 1999 (updated Oct. 11, 2006), 20 pages.
Hasenstein, Michael, "IP Address Translation", http://www.csn.tu-chemnitz.de/HyperNews/get/linux-ip-nat.html, 1997, 50 pages.
Hasenstein, Michael, "Linux IP Network Address Translation", http://web.archive.org/web/20031209024748/http://www.hasenstein.com/HyperNews/get/linus-ip-nat.html, Dec. 2003, 12 pages.
Zhou, Tao, "Web Server Load Balancers", http://windowsitpro.com/print/networking/web-server-load-balancers, Feb. 29, 2000, 7 pages.
Bourke, Tony, "Server Load Balancing", Server Load Balancing, 2001, O'Reilly & Associates, Inc., Published by O'Reilly & Associates Inc., 101 Morris Street, Sebastopol CA 95472, Printed Aug. 2001, First Edition, 182 pages.

* cited by examiner

GLOBAL SERVER LOAD BALANCING

CROSS-REFERENCE TO RELATED APPLICATIONS

The present application is a continuation of U.S. application Ser. No. 10/376,903, entitled "GLOBAL SERVER LOAD BALANCING," filed Feb. 28, 2003, which is a continuation-in-part of U.S. application Ser. No. 10/206,580, entitled "GLOBAL SERVER LOAD BALANCING," filed Jul. 25, 2002, which is a continuation-in-part of U.S. application Ser. No. 09/670,487, entitled "GLOBAL SERVER LOAD BALANCING," filed Sep. 26, 2000, all of which are assigned to the same assignee as the present application, and are incorporated herein by reference their entireties.

BACKGROUND OF THE INVENTION

1. Field of the Invention

This disclosure relates generally to load balancing among servers. More particularly but not exclusively, the present disclosure relates to achieving load balancing by, in response to resolving a DNS query by a client, providing the address of a server that is expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS server for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS server does not detect a server that is down. Consequently, the authoritative DNS server continues to return a disabled host server's IP address until an external agent updates the authoritative DNS server's resource records. Second, when providing its list of IP addresses, the authoritative DNS server does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

SUMMARY OF THE INVENTION

One aspect of the present invention provides an improved method and system for serving IP addresses to a client, based on a selected set of performance metrics. In accordance with this invention, a global server load balancing (GSLB) switch is provided as a proxy for an authoritative DNS server, together with one or more site switches each associated with one or more host servers. Both the GSLB switch and the site switch can be implemented using the same type of switch hardware in one embodiment. Each site switch provides the GSLB switch with current site-specific information regarding the host servers associated with the site switch. Under one aspect of the present invention, when an authoritative DNS server resolves a host name in a query and returns one or more IP addresses, the GSLB switch filters the IP addresses using the performance metrics compiled from the site-specific information collected from the site switches and/or other metrics. The GSLB switch then returns a ranked or weighted list of IP addresses to the inquirer. In one embodiment, the IP address that is estimated to provide the best-expected performance for the client is placed at the top of the list.

Examples of suitable performance metrics include availability metrics (e.g., a server's or an application's health), load metrics (e.g., a site switch's session capacity or a corresponding preset threshold), and proximity metrics (e.g., a round-trip time between the site switch and a requesting DNS server, the geographic location of the host server, the topological distance between the host server and the client program). (A topological distance is the number of hops between the server and the client). Another proximity metric is the site switch's "flashback" speed (i.e., how quickly a switch receives a health check result). Yet another metric is a connection-load metric that is based on a measure of new connections-per-second at a site. The ordered list can also be governed by other policies, such as the least selected host server.

In accordance with embodiments of the invention, a weighted site or a weighted IP metric can be used. The weighted site metric can be based on a weight that determines how much traffic a site will receive with respect to other sites in comparison, while the weighted IP can be based on a weight that determines how much traffic an IP address will receive with respect to other IP addresses in comparison. An embodiment provides an active bindings metric that is based on a measure of the number of active real servers bound to a virtual IP address residing on a GSLB site. The active bindings metric bases its selection of the best IP address on this number and prefers a VIP with the highest number of active bindings.

The present invention is better understood upon consideration of the detailed description of the embodiments below, in conjunction with the accompanying drawings.

BRIEF DESCRIPTION OF THE DRAWINGS

FIG. 2D depicts the relative position of portions of the flow chart.

DETAILED DESCRIPTION

Embodiments for global server load-balancing are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
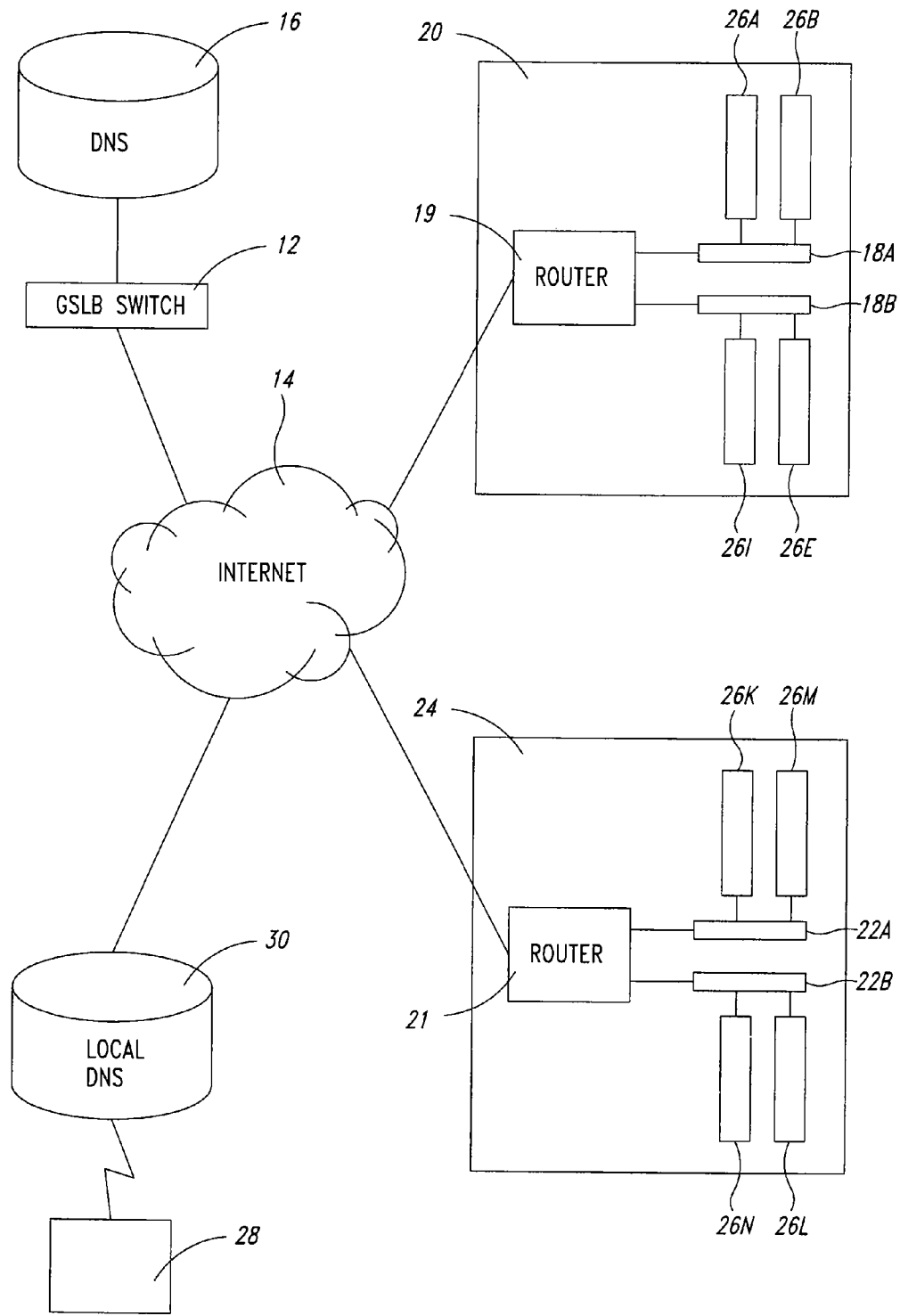
FIG. 1 illustrates a global server load-balancing configuration in accordance with one embodiment of the invention.

FIG. 1 illustrates one embodiment of the present invention that provides a global server load-balancing configuration. As shown in FIG. 1, a global server load balancing (GSLB) switch 12 is connected to an Internet 14 and acts as a proxy to an authoritative Domain Name System (DNS) server 16 for the domain "foundrynet.com" (for example). That is, while the actual DNS service is provided by DNS server 16, the IP address known to the rest of the Internet for the authoritative DNS server of the domain "foundrynet.com" is a virtual IP (VIP) address configured on GSLB switch 12. Of course, DNS server 16 can also act simultaneously as an authoritative DNS server for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp).

These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc. of San Jose, Calif.

FIG. 1 also shows a client program 28 connected to Internet 14, and communicates with local DNS server 30. When a browser on client program 28 requests a web page, for example, using a Universal Resource Locator (URL), such as http://www.foundrynet.com/index.htm, a query is sent to local DNS server 30 to resolve the symbolic host name www-.foundrynet.com to an IP address of a host server. The client program 28 receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12 based on metrics described in further detail below.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment, GSLB switch 12 determines which site switch would provide the best expected performance (e.g., response time) for client program 28 and returns the IP address list with a virtual IP address configured at that site switch placed at the top. (Within the scope of the present invention, other forms of ranking or weighting the IP addresses in the list can also be possible.) Client program 28 can receive the ordered list of IP addresses, and typically selects the first IP address on the list to access the corresponding host server.

Figure 3:
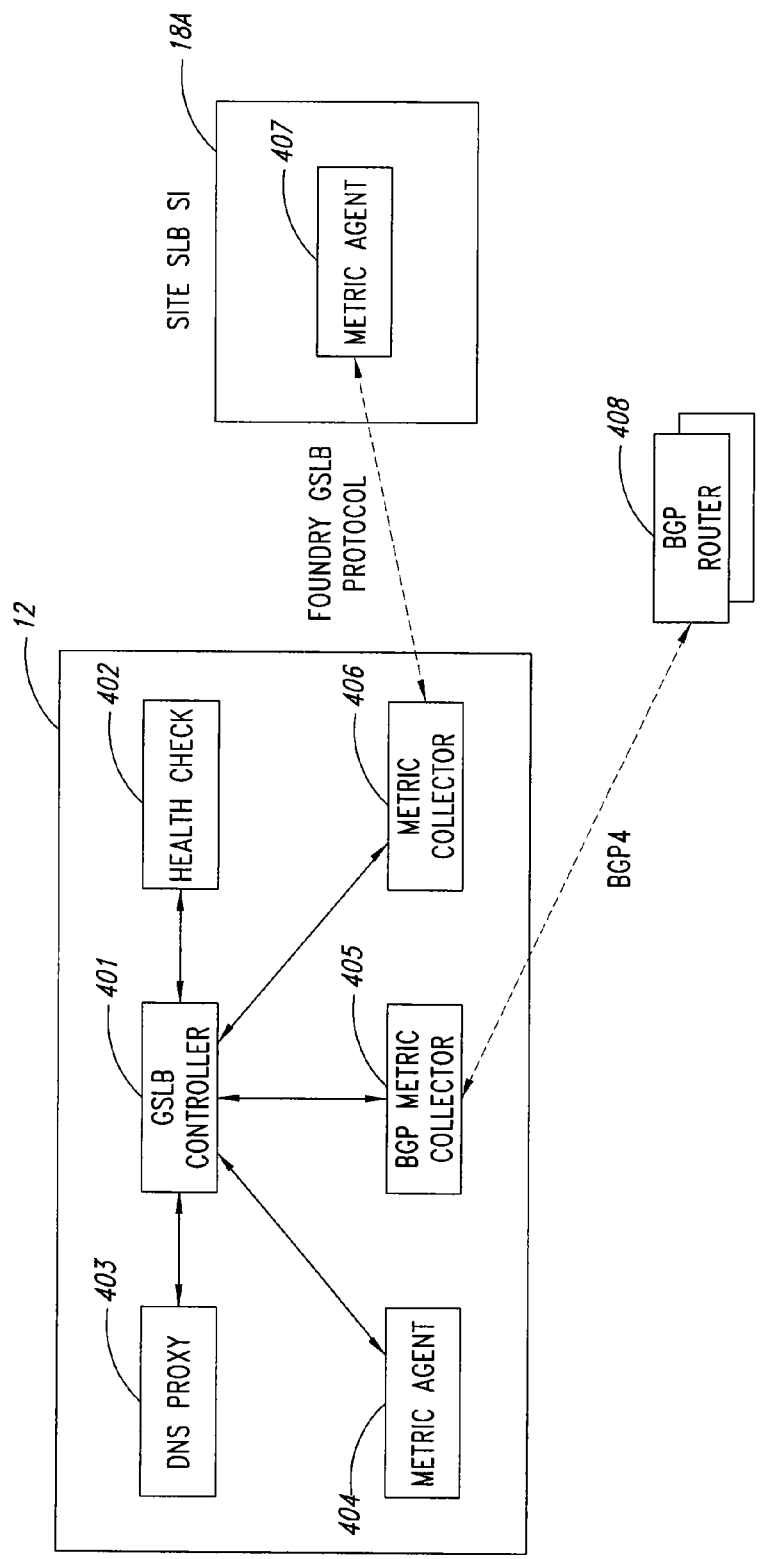
FIG. 3 is a block diagram showing the functional modules of a GSLB switch and a site switch relevant to the global server load balancing function in accordance with one embodiment of the invention.

FIG. 3 is a block diagram showing the functional modules of GSLB switch 12 and site switch 18A relevant to the global server load balancing function. As shown in FIG. 3, GSLB switch 12 includes a GSLB switch controller 401, health check module 402, DNS proxy module 403, metric agent 404, routing metric collector 405, and metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. The metric collector 406 communicates with metric agents in site-specific switches (e.g., FIG. 3 shows metric collector 406 communicating with metric agent 407 of a site server load balancing ServerIron or "SLB SI") to collect site-specific metrics (e.g., number of available sessions on a specific host server and/or connection-load data at that host server or other metric data). Any suitable communication protocol can be used for the communication between the metric collector 406 and the metric agent 407.

For example for a connection-load metric in one embodiment, metric agent(s) 407 can perform sampling to obtain connections-per-second at their respective site, and then obtains load averages from the samples or performs other calculations. The metric collector 406 of the GSLB switch 12 then obtains the load averages from the metric agent(s) 407 and provides these load averages to the switch controller 401, to allow the switch controller 401 to use the load averages to rank the IP addresses on the ordered list. Alternatively or in addition to the metric agent(s) 407, the switch controller 401 can perform at least some or most of the connection-load calculations from sampling data provided by the metric agent(s) 407.

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (a) receives incoming DNS requests, (b) provides the host names to be resolved to DNS server 16, (c) receives from DNS server 16 a list of responsive IP addresses, (d) orders the IP addresses on the list received from DNS server 16 according to an embodiment of the present invention, using the metrics collected by routing-metric collector 405 and site specific collector 406, and values of any other relevant parameter, and (e) provides the ordered list of IP addresses to the requesting DNS server. Alternatively or in addition, the GSLB switch controller 401 can perform at least some of these operations. Since GSLB switch 12 can also act as a site switch, GSLB switch 12 is provided a metric agent 404 for collecting metrics for a metric collector.

In one embodiment, the GSLB switch controller 401 can be programmed with data to be used for at least one of weighted site, weighted IP, or active bindings metrics. For example for the weighted site metric, the GSLB switch controller 401 can be programmed with the assigned weights for particular sites (e.g., the sites 20 and 24). For example for the weighted IP metric, the GSLB switch controller 401 can be programmed with the assigned weights for IP addresses for a particular zone. Alternatively or in addition to being programmed into the GSLB switch controller 401, these weight assignments can be stored in a component (such as in a database or memory) that is remote from, but accessible to, the GSLB switch controller 401 (or other component of the GSLB switch that can use this metric to reorder address lists).

In one embodiment, the metrics used in a GSLB switch 12 includes, but are not limited to: (a) the health of each host server and selected applications, (b) the assigned weights under the weighted site metric, or under the weighted IP metric in the alternative, (c) each site switch's session capacity threshold, (d) the round trip time (RTT) between a site switch and a client in a previous access, (e) the geographical location of a host server, (f) the connection-load measure of new connections-per-second at a site switch, (g) the current available session capacity in each site switch, (h) active bindings or the measure of the number of active real servers bound to a VIP residing on a GSLB site, (i) the "flashback" speed between each site switch and the GSLB switch (i.e., how quickly each site switch responds to a health check from the GSLB switch), and (j) a policy called the "Least Response Selection" (LRS) which prefers the site least selected previously. Many of these performance metrics can be provided default values. Each individual metric can be used in any order and each metric can be disabled. In one embodiment, the LRS metric is always enabled.

Figure 2A:
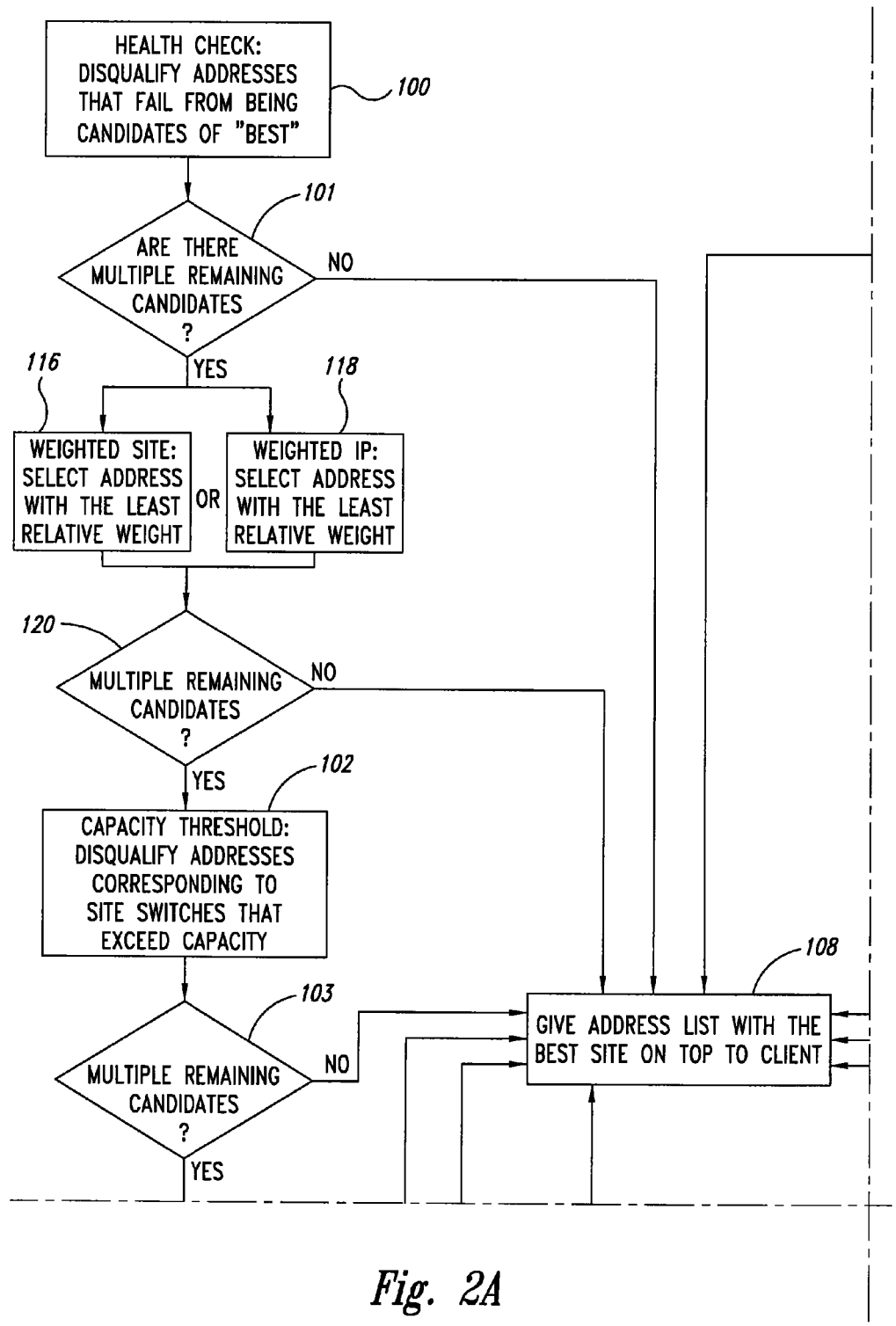
FIGS. 2A-2D illustrate in a flow chart one embodiment of an algorithm for selecting the "best" address from the list of addresses supplied by an authoritative DNS, where
Figure 2B:
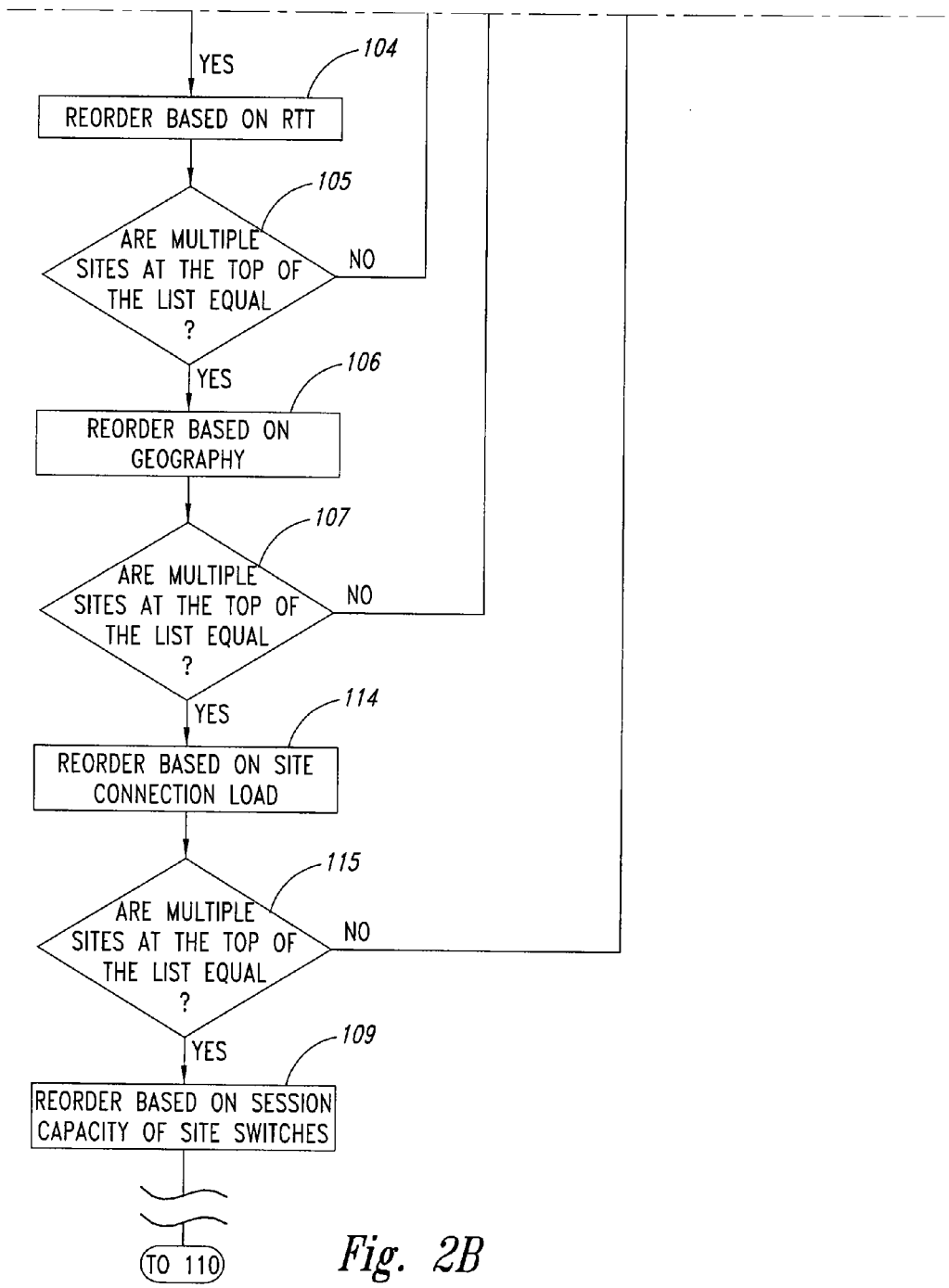
Figure 2C:
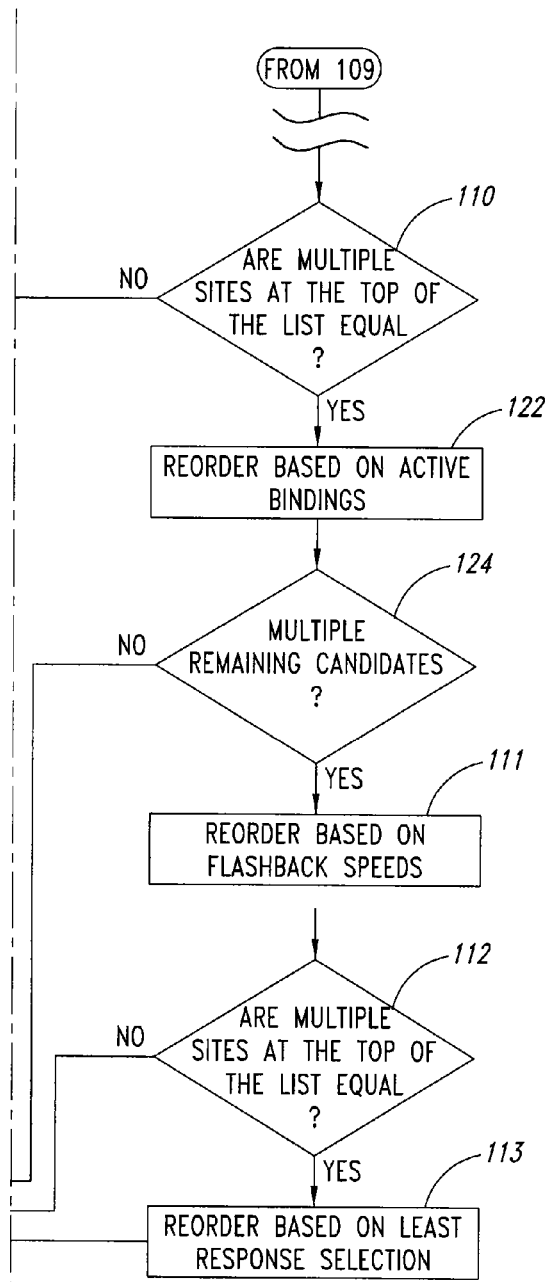
Figure 2D:
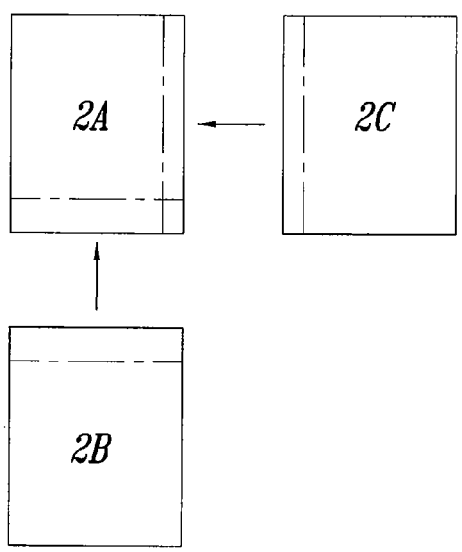

FIGS. 2A-2D illustrate in a flow diagram one embodiment of an optimization algorithm utilized by GSLB switch 12 to process the IP address list received from DNS server 16, in response to a query resulting from client program 28, where FIG. 2D shows the relative position of portions of the flow diagram shown in FIGS. 2A-2C. At least some of the elements of the flow diagram can be embodied in software or other machine-readable instruction stored on one or more machine-readable storage media. For example, such software to perform portions of the algorithm may be present at the GSLB switch 12 in one embodiment and executed by the switch controller 401.

As shown in FIG. 2A, in act 100, upon receiving the IP address list from DNS server 16, GSLB switch 12 performs, for each IP address on the IP address list (e.g., host server 261 connected to site switch 18B), a layer 4 health check and a layer 7 check. Here, layers 4 and 7 refer respectively to the transport and application protocols in the Open System Interconnection (OSI) protocol layers. The layer 4 health check can be a Transmission Control Protocol (TCP) health check or a User Datagram Protocol (UDP) health check. Such a health check can be achieved, for example, by a "ping-like" operation defined under the relevant protocol. For example, under the TCP protocol, a TCP SYN packet can be sent, and the health of the target is established when a corresponding TCP ACK packet is received back from the target. In this embodiment, the layer 7 health check is provided for specified applications, such as the well-known HyperText Transport Protocol (HTTP) and the File Transfer Protocol (FTP) applications. An embodiment of a technique to distribute health check tasks to peer metric agents (e.g., the metric agents 407) is disclosed in U.S. application Ser. No. 10/305,823, entitled "DISTRIBUTED HEALTH CHECK FOR GLOBAL SERVER LOAD BALANCING," filed Nov. 27, 2002, with inventor Prajakta S. Joshi et al., assigned to the same assignee as the present application and incorporated herein by reference in its entirety.

If a host server or an associated application fails any of the health checks, it is disqualified from being the "best" site and may be excluded from the IP address list to be returned to client program 28. Since the health check indicates whether or not a host server or an associated application is available, the health check metric is suitable for use to eliminate an IP address from the candidates for the "best" IP address (i.e., the host server expected to provide the highest performance). After act 100, if the list of IP addresses has only one IP address (act 101), the list of IP addresses is returned to client program 28 at act 108.

After act 100, if the list of candidate IP addresses for the best site has multiple IP addresses, then the list of candidate IP addresses is assessed next either under the weighted site metric at act 116 or under the weighted IP metric at act 118. In an embodiment, only one of these two metrics can be enabled at any one time. The weighted site metric at act 116 will be described herein first, followed by the weighted IP metric at act 118.

With the weighted site metric, traffic can be distributed among sites (e.g., the sites 20 and 24) based on weights configured for those sites. The GSLB switch controller 401 achieves the distribution by selecting an IP address belonging to a particular site to be the best IP address in the DNS reply to the client program 28, and the client program 28 subsequently makes request to access that IP address.

The weighted site metric is an optional metric in the GSLB algorithm of FIGS. 2A-2D. It is disabled by default in an embodiment, and when enabled, it is placed by default after the health-check metric at act 100. Placing the weighted site (or weighted IP) metric after the health check metric is beneficial in that the health check metric eliminates sites that are down, and thus deviates traffic from these sites. It is appreciated that the default metric order can be changed anytime using any suitable metric-order command at the policy configuration level.

To use the weighted site-metric, the metric is enabled and weights are assigned to the GSLB sites (e.g., the sites 20 and 24). Each site may include of one or more site switches (e.g., the site switches 18A and 18B for the site 20), but the weight is applicable to the site on the whole. This weight determines how much traffic the site will receive with respect to other sites in comparison, which themselves may or may not be weighted.

For example, three sites may be assigned the following weights: San Jose: 50; New York: 30; and London: 20, which instructs the GSLB switch controller 401 to send 50% of the traffic to San Jose, 30% of the traffic to New York and 20% of the traffic to London. The weight assigned to a site determines the percentage of traffic that the site will receive relative to weights of other sites in comparison. According to various embodiments, these programmed weights may be present in databases, lookup tables, software code, memory, or other data repository at the GSLB switch 12 or other accessible location, including at the sites themselves.

In the above-mentioned example, the distribution is straightforward because the total weight of all three sites is 100, which makes the distribution simpler. However, a total weight of 100 is not a requirement. Weights may be chosen such as: San Jose: 15; New York: 20; and London: 10, making the total weight 45. Thus, the traffic distribution will be: San Jose: 33% (15/45*100); New York: 44% (20/45*100); and London: 22% (10/45*100). The relative percentages may be calculated by the GSLB switch controller 401 (or by some other component or software) by normalizing the total weight to 100%.

When evaluating the potential candidates using the weighted site metric at act 116, the GSLB switch controller 401 bases the selection on the number of times an IP address is already selected, since it generally cannot be accurately anticipated how many requests are going to be made in the future. One or more counters (not shown) may be present in the GSLB switch 12 to count each time an IP address is selected as best, although it is appreciated that external servers or other components can be used alternatively or in addition to the counter(s) to track such selection data. The following formula is used in one embodiment to compute a relative weight for each IP address and to select the IP address with the least relative weight:

$$\text{RelativeWeight}_{ip} = (\text{SelectionCounter}_{ip} * \text{Sum}_{x=1 \text{ to } N} \{\text{Weight}_{ip\_x}\}) / \text{Weight}_{ip}$$

where, $\text{SelectionCounter}_{ip}$: refers to a number of times the GSLB switch controller 401 selected the IP address as the best choice over the other candidates;

N: refers to a number of eligible candidate IP addresses to be evaluated by the weighted site metric; and $\text{Weight}_{ip}$: refers to a calculated weight assigned to an IP address based on the following criteria:

If the IP address corresponds to a real server, then $\text{Weight}_{ip}$ is zero (0). In such cases, $\text{RelativeWeight}_{ip}$ is calculated to be MaxRelativeWeight; and If the IP address is a virtual IP (VIP) address, then $\text{Weight}_{vip}$ is calculated as follows:

$$\text{Weight}_{vip} = \text{Weight}_{Site\_X} / \text{NumCandidateVips}_{Site\_X}$$

where,

Site X: refers to the site to which the VIP belongs;

$\text{Weight}_{Site\_X}$: refers to weight of Site_X; and $\text{NumCandidateVips}_{Site\_X}$: refers to a number of candidate VIP addresses belonging to Site_X that are being evaluated by the weighted site metric.

It is noted that in an embodiment, if the $\text{RelativeWeight}_{ip}$ of an IP address is equal to MaxRelativeWeight, the IP address is eliminated from being selected as the best IP address. This will be the case for all real servers and also for VIP addresses that belong to sites with no weights configured or configured with weights of zero. If the user wishes to use the weighted site metric, the user assumes that all IP addresses are VIP addresses belonging to sites to which the user wishes to distribute traffic. If the user wants a site to be ignored by the weighted site metric, the site can be ignored by not configuring a weight for that site. Since a real server is not part of any site in one implementation, an embodiment mimics the same behavior and assigns the real server with a weight of zero(0), so that the real server is ignored when the weighted site metric evaluates candidate IP addresses.

If all candidate IP addresses have a $\text{RelativeWeight}_{ip}$ of MaxRelativeWeight at act 120, the weighted site metric will make no selection and passes all the candidates to the next stage in the GSLB algorithm. Likewise, if two or more VIP addresses have equal values of $\text{RelativeWeight}_{ip}$ at act 120, all of them are passed on as eligible candidates to the next stage in the GSLB algorithm. If there are no multiple remaining address candidates at act 120 after application of the weighted site metric, then the IP address list (with the best IP address placed on top) is passed to the client program 28 at act 108

If DNS response selection counters are maintained per domain name in one embodiment, the weighted site metric distribution is accurate with respect to the domain name. Consider the following example:

Assume three sites with the following weights: San Jose (50); New York (30); and London (20). All three sites host the application www.gslb.com and sites New York and London also host ftp.gslb.com. This scenario is illustrated below:

www.gslb.com 1.1.1.1 (VIP address, belongs to site San Jose, with weight 50)

1.1.1.2 (VIP address, belongs to site New York, with weight 30)

1.1.1.3 (VIP address, belongs to site London, with weight 20)

ftp.gslb.com 1.1.1.2 (VIP address, belongs to site New York, with weight 30)

1.1.1.3 (VIP address, belongs to site London, with weight 20)

Assuming 10 DNS requests (for example) are made to www.gslb.com, the traffic distribution among the sites is San Jose (5 requests, 50%), New York (3 requests, 30%), and London (2 requests, 20%). This distribution can be viewed by looking at the DNS selection counters for www.gslb.com, such as by using a command line interface (CLI) command: show gslb dns zone.

Now for example, if 5 requests are made to ftp.gslb.com and since an embodiment maintains counters per domain and not per IP address, the distribution is New York (3 requests, 60%) and London (2 requests, 40%), which reflects the weights 30 and 20, normalized to 60 and 40 respectively. However, if the total site traffic for both applications is considered, then the traffic distribution is San Jose (5 requests, 33%), New York (6 requests, 40%) and London (4 requests, 26%), which does not correlate with the weights assigned to the sites. Hence, the results of the weighted metric is evaluated by an embodiment with respect to a specific domain name.

To use the weighted site metric, the metric is enabled in the GSLB algorithm (or policy) and weights are assigned to configured sites. These may be performed by a system administrator or in an automated manner via software. The various implementations below use example CLI commands for purposes of illustration and explanation. It is appreciated that other embodiments can perform the relevant operation using different types of commands and/or other syntax.

The weighted site metric can be enabled/disabled at the "gslb policy" config level of the CLI using the following:

SLB-ServerIron(config-gslb-policy)# [no] weighted-site

The weights can be configured per site at the "gslb site <site-name>" configuration level using the following CLI command for San Jose (as an example site):

SLB-ServerIron(config-gslb-policy)# gslb site SanJose

SLB-ServerIron(config-gslb-site-SanJose)# weight 50

The default metric order can be changed using the following CLI command:

SLB-ServerIron(config-gslb-policy)#  metric-order set weighted-site

The results of the distribution can be viewed with the following CLI command:

SLB-ServerIron(config)#show gslb traffic site

This command shows for each site, all domains hosted by the site, and for each domain name, the amount of traffic is sent to each site switch (a ServerIron SI) at that site and the total percentage of traffic sent to the site. The following is a sample output of the command:

```
3/1 #show gslb traffic site
SITE: local          Weight: 50
    * a.b.c
    DNS Requests: 36
        SI       VIP          Selection (%)

1.1.1.1   1.1.1.181    9 (25%)
        1.1.1.1   1.1.1.180    9 (25%)
    Site Selection for Domain: 18 (50%)
    * b.b.c
    DNS Requests: 0
        SI       VIP          Selection (%)

1.1.1.1   1.1.1.121    0 (0%)
    Site Selection for Domain: 0 (0%)
SITE: TWO            Weight: 50
    * a.b.c
    DNS Requests: 36
        SI       VIP          Selection (%)

1.1.1.2   1.1.1.182    18 (50%)
    Site Selection for Domain: 18 (50%)
    * b.b.c
    DNS Requests: 0
        SI       VIP          Selection (%)

1.1.1.2   1.1.1.122    0 (0%)
    Site Selection for Domain: 0 (0%)
SITE: THREE
    * a.b.c
    DNS Requests: 36
        SI       VIP          Selection (%)

1.1.1.3   1.1.1.183    0 (0%)
    Site Selection for Domain: 0 (0%)
    * b.b.c
    DNS Requests: 0
        SI       VIP          Selection (%)

1.1.1.3   1.1.1.123    0 (0%)
    Site Selection for Domain: 0 (0%)
```

In the above example, there are two hosts, a(http) and b(ftp) belonging to the zone b.c. There are three sites as listed below:

Local (weight: 50, SI: 1.1.1.1, Vips: 1.1.1.180(http), 1.1.1.181(http), 1.1.1.121(ftp))

TWO (weight: 50, SI: 1.1.1.2, Vips: 1.1.1.182(http), 1.1.1.122(ftp))

THREE (weight: 0, SI: 1.1.1.3, Vips: 1.1.1.183(http), 1.1.1.123(ftp))

The IP resolution for the domain names is as follows:
a.b.c: 1.1.1.180, 1.1.1.181, 1.1.1.182, 1.1.1.183
b.b.c: 1.1.1.121, 1.1.1.122, 1.1.1.123

The metric order selected was "site weight," followed by the tie-breaker "least-response-selection" (LRS) where the prior metric was inconclusive. After making 36 requests for domain "a.b.c," the distribution was:

Site Local: received 18 requests (VIP 1.1.1.180 received 9 requests, and VIP 1.1.1.181 received 9 requests);

Site TWO: received 18 requests (VIP 1.1.1.182 received all 18 requests); and

Site THREE: did not receive any requests, owing to its weight zero.

Note that within a site, each VIP address is considered equal by one embodiment of the weighted site metric. The tie between the addresses is broken by the next stage in the GSLB algorithm. In this case, the tie was broken by the "least response" metric, although it is appreciated that any suitable one of the subsequent metrics could have broken the tie.

Per-metric response selection counters (not shown) can be viewed by the existing CLI command "show gslb dns detail," which has been extended to include support for the weighted site metric. Examples of implementations of per-metric response counters are disclosed in U.S. application Ser. No. 10/211,822, entitled "STATISTICAL TRACKING FOR GLOBAL SERVER LOAD BALANCING," filed Aug. 1, 2002, and disclosed in U.S. application Ser. No. 10/377,364, entitled "METHOD AND SYSTEM TO CLEAR COUNTERS USED FOR STATISTICAL TRACKING FOR GLOBAL SERVER LOAD BALANCING," filed concurrently herewith, with inventor Sunanda L. Kommula. Both of these co-pending applications are assigned to the same assignee as the present application and are incorporated herein by reference in their entireties.

The weighted IP metric at act 118 is now explained. The weighted IP metric allows a user (e.g., a system administrator) to distribute traffic among IP addresses in the DNS reply, based on the weights configured for the IP addresses. The weighted-IP-metric is an optional metric in the GSLB algorithm of FIGS. 2A-2D in one embodiment, and is disabled by default. When enabled, the weighted IP metric by default is placed after the health check metric of act 100 in the GSLB algorithm. As before, the default metric order can be changed anytime using the "metric-order" command (or other suitable command) at the GSLB policy configuration.

To use the weighted IP metric, the user enables the metric and assigns weights to the desired IP addresses. The weight of an IP address determines the percentage of traffic that the IP address will receive with respect to the other candidate IP addresses, which themselves may or may not be weighted. For example, the user may assign weights to the three IP address for zone www.gslb.com according to the following: 1.1.1.80: 50; 1.1.2.80: 30; and 1.1.3.80: 20. Based on these assigned weights, the GSLB switch controller 401 will send 50% of the traffic to www.gslb.com to 1.1.1.80; 30% to 1.1.2.80; and 20% to 1.1.3.80.

In the above-described example, the distribution is again straightforward because the total weight of all three IP addresses is 100, which makes the distribution simpler. However, having a total weight of 100 is not a requirement. Weights such as 1.1.1.80: 15; 1.1.2.80: 20; and 1.1.3.80: 10 can be chosen, thus making the total weight 45. The traffic distribution in this instance will therefore be 1.1.1.80: 33% (15/45*100); 1.1.2.80: 44% (20/45*100); and 1.1.3.80: 22% (10/45*100). The relative percentages are calculated by normalizing the total weight to 100%.

In an embodiment, when the user configures a zone and a host for GSLB, the GSLB switch controller 401 will start making background DNS queries for the configured zones and hosts and stores the IP addresses that are resolved, and does the necessary pre-processing for each IP address, so as to efficiently serve DNS requests from clients. This behavior remains unchanged when the weighted IP metric is enabled. As usual, the GSLB switch controller 401 resolves configured domain names to IP addresses, and the default weight for each IP address is zero. Once the user configures the weight against an IP address, the weight is used as appropriate by the weighted IP metric.

As with the weighted site metric, the weighted IP metric (when enabled) is placed second in the GSLB algorithm at act 118 after the health check metric at act 100, so as to allow the health check metric to deviate traffic from downed IP addresses. As before, the metric order can be changed or other metrics can be enabled/disabled to satisfy specific requirements.

When evaluating the potential candidates using the weighted IP metric, the selection is based on the number of times an IP address is already selected, since the number of requests that are going to be made in the future generally cannot be anticipated. The following example formula is used in one embodiment to compute a relative weight for each IP address and to select the IP address with the least relative weight:

$$RelativeWeight_{ip} = (SelectionCounter_{ip} * Sum_{x=1\ to\ N} \{Weight_{ip\_x}\})/Weight_{ip}$$

where,
- SelectionCounter$_{ip}$: refers to the number of times the GSLB switch controller 401 selected the IP address as the best choice over the other candidates;
- N: refers to the number of eligible candidate IP addresses to be evaluated by the weighted IP metric; and
- Weight$_{ip}$: refers to the weight assigned to the IP address.

If a weight for an IP address is not assigned or otherwise configured, the Weight$_{ip}$ of the IP address is assumed to be zero. In such cases, RelativeWeight$_{ip}$ is calculated to be MaxRelativeWeight. If the RelativeWeight$_{ip}$ of an IP address is equal to MaxRelativeWeight, the IP address will be eliminated from being selected as the best IP address. This will be the case for all IP addresses with no weights configured or configured with zero (0) weights.

If all candidate IP addresses have a RelativeWeight$_{ip}$ of MaxRelativeWeight, the weighted IP metric will make no selection and passes all the candidates to the next stage in the GSLB algorithm. Likewise, if two or more IP addresses have equal values of RelativeWeight$_{ip}$ at act 120, all of them are passed on as eligible candidates to the next stage of the GSLB algorithm. If the weighted IP metric is able to identify the best IP address, based on that IP address having the least relative weight, then that IP address is placed at the top of the address list, and the address list is passed to the client program 28 at act 108.

As mentioned above, to use the weighted IP metric, the user needs to enable the metric in the GSLB policy and assign weights to IP addresses. The weighted IP metric can be enabled/disabled at the "gslb policy" config level of the CLI using the following command:
SLB-ServerIron(config-gslb-policy)# [no] weighted-IP
SLB-ServerIron(config-gslb-policy)# gslb dns zone gslb.com
SLB-ServerIron(config-gslb-dns-gslb.com)# host www http The second command above configures the zone gslb.com, while the third command above configures the host www as a http application of gslb.com.

The weights can be assigned or configured per IP address at the "gslb dns zone" config level using the following CLI command syntax:
SLB-ServerIron(config-gslb-dns-gslb.com)# host www ip-weight <ip><weight>
An example of this is the following, to assign a weight of 50 to an IP address 1.1.1.80 for the zone gslb.com:
SLB-ServerIron(config-gslb-dns-gslb.com)# host www ip-weight 1.1.1.80 50

The default metric order can be changed using the following CLI command:
SLB-ServerIron(config-gslb-policy)# metric-order set weighted-ip The results of the traffic distribution can be viewed with the following CLI command:
SLB-ServerIron(config)#show gslb dns zone After act 120, if the list of candidate IP address for the best site has multiple IP addresses after the weighted site or weighted IP metrics are applied, the IP address list is further assessed in act 102 based upon the capacity threshold of the site switch serving that IP address. Each site switch may have a different maximum number of TCP sessions it can serve. For example, the default number for the "ServerIron" product of Foundry Networks is one million sessions, although it can be configured to a lower number. The virtual IP address configured at site switch 18B may be disqualified from being the "best" IP address if the number of sessions for switch 18B exceed a predetermined threshold percentage (e.g., 90%) of the maximum number of sessions. (Of course, the threshold value of 90% of the maximum capacity can be changed.) After act 102, if the list of IP addresses has only one IP address (act 103), the list of IP addresses is returned to client program 28 at act 108.

After act 102, if the IP address list has multiple IP addresses (act 103), the remaining IP addresses on the list can then be reordered in act 104 based upon a round-trip time (RTT) between the site switch for the IP address (e.g., site switch 18B) and the client (e.g., client 28). The RTT is computed for the interval between the time when a client machine requests a TCP connection to a proxy server configured on a site switch, sending the proxy server a TCP SYN packet, and the time a site switch receives from the client program a TCP ACK packet. (In response to the TCP SYN packet, a host server sends a TCP SYN ACK packet, to indicate acceptance of a TCP connection; the client machine returns a TCP ACK packet to complete the setting up of the TCP connection.) The GSLB switch (e.g., GSLB switch 12) maintains a database of RTT, which it creates and updates from data received periodically from the site switches (e.g., site switches 18A, 18B, 22A and 22B). Each site collects and stores RTT data for each TCP connection established with a client machine. In one embodiment, the GSLB switch favors one host server over another only if the difference in their RTTs with a client machine is greater than a specified percentage, the default specified percentage value being 10%, for example. To prevent bias, the GSLB switch ignores, by default, RTT values for 5% of client queries from each responding network, for example. After act 105, if the top entries on the list of IP addresses do not have equal RTTs, the list of IP addresses is returned to client program 28 at act 108.

If multiple sites have equal RTTs (act 105), then the list is reordered in act 106 based upon the location (geography) of the host server. The geographic location of a server is determined according to whether the IP address is a real address or a virtual IP address ("VIP"). For a real IP address, the geographical region for the host server can be determined from the IP address itself. Under IANA, regional registries RIPE (Europe), APNIC (Asia/Pacific Rim) and ARIN (the Americas and Africa) are each assigned different prefix blocks. In one embodiment, an IP address administered by one of these regional registries is assumed to correspond to a machine located inside the geographical area administered by the regional registry. For a VIP, the geographic region is determined from the management IP address of the corresponding site switch. Of course, a geographical region can be prescribed for any IP address to override the geographic region determined from the procedure above. The GSLB switch prefers an IP address that is in the same geographical region as the client machine in an embodiment. At act 107, if the top two entries on the IP list are not equally ranked, the IP list is sent to the client program 28 at act 108.

After act 107, if multiple sites are of equal rank for the best site, the IP addresses can then be reordered based upon site connection load (act 114). The connection-load metric feature allows comparison of sites based on the connection-load on their respective agent (e.g., at the metric agent 407 of the site ServerIron switch 18A in FIG. 3, for instance).

The connection-load is a measure of new connections-per-second on the agent 407 in one embodiment. An administrator can set a threshold limit for the connection-load to pass a given site; can select the number of load sampling intervals and duration of each interval; and can select the relative weight for each interval to calculate the average load for a period of time (i.e., new connections per the period of time).

The "connection load limit" value specifies the load limit for any site to pass the metric. The minimum value is 1, and a parser or other software component in the site switch 18A, for instance, limits the maximum value—there need not be a default value. By default, this connection-load metric is turned off and can be turned on when the load limit is specified. The average load for a given site is calculated using the user-defined weights and intervals, which will be explained later below. If the calculated average load is less than the load limit specified, the site is passed on to the next stage of the GSLB algorithm described herein—otherwise that site is eliminated/rejected from the set of potential candidates.

In one embodiment, the number of "load sampling intervals" and also the "sampling rate" can be configured. The sampling rate defines the duration of each sampling interval in multiples of the initial rate. For example, if 6 sampling intervals and a sampling rate of 5 seconds are chosen, the site will sample the average load at 5, 10, 15, 20, 25, and 30. At any instant, the site will have the average load for the previous 5 seconds, 10 seconds, 15 seconds, 20 seconds, 25 seconds, and 30 seconds. This is a "moving average" in that at the 35th second, for example, the average for the 5th to 35th seconds is calculated. Note that even though this is a moving average, the accuracy is limited by the initial sampling rate, meaning that since samples are taken after every 5 seconds, at the 7th second, the average for the 1st to 5th second is available and not the 2nd to 7th second average.

The sampling rate also defines the update interval for the site (e.g., the metric agent 407) to upload the load averages to the metric collector 406 at the GSLB switch 12. A given site is capable of maintaining load-averages for any number of collectors at a time. Each collector is updated with the load information periodically, and the update interval is also specific to the collector in various example embodiments.

The minimum number of intervals is 1 and the max is 8 in one embodiment. The default number is 5, which is set when the connection load limit is configured. It is appreciated that these are merely illustrative examples and may be different based on the particular implementation.

For the load-sampling interval, the minimum value is 1 second and maximum value is 60 seconds. The default value is 5 seconds. So, the maximum range for load average calculation is 60*8 seconds=480 seconds=8 minutes. Thus, one can consider up to the previous 8-minute average for load analysis. Again, these are example settings.

Weights can be assigned to each interval to calculate the average load. By default in one embodiment, each interval is given an equal weight of 1. The average load for a site can be calculated using the following formula:

$$\frac{\sum_{i=0}^{N}(AvgLoad \text{ of interval } i) * (\text{Weight of interval } i)}{\sum_{i=0}^{N}(\text{Weight of interval } i)}$$

where N=Number of sampling intervals and AvgLoad of interval i=new connections of interval i.

The contribution of any interval can be nullified by giving it a weight of zero. If every interval is given a weight of zero, the average load is zero. (We cannot divide by zero). In one embodiment, the metric agent 407 can calculate this average load and provide it to the metric collector 406 at the GSLB switch 12. In other embodiments, the metric collector 406 and/or the switch controller 401 can perform the average load calculation based on values collected and provided by the metric agent 407.

By default, the connection-load metric is not turned on in the GSLB algorithm. The metric is automatically turned on when the user specifies the connection-load limit, in an embodiment. The specific configuration needs for connection-load sampling and calculation can be configured on the switch controller 401, whether the switch 12 is used for GSLB or as a site-specific switch. To configure the connection load limit (such as a connection load limit of 500), at the GSLB policy configuration level, the following example command can be used:

SW-GSLB-Controller (config-gslb-policy) #connection-load limit 500

Again, as described above, if the calculated average load is less than this limit, then the site is kept as a potential candidate.

To configure the number of sampling intervals and the sampling rate (e.g., sampling rate=5, interval=6), the following example command may be used:

SW-GSLB-Controller (config-gslb-policy) #connection-load intervals 6 5

To configure the interval weights, the following example command can be used:

SW-GSLB-Controller (config-gslb-policy) #connection-load weights 1 2 3 4 5 6

The syntax of this command is:

connection-load weights<weight of interval-1><weight of interval-2><weight of interval-3> . . . up to 8, for example.

All weights for all intervals need not be configured if not considering beyond a certain point. The configured weights will be assigned to intervals starting from the first and any non-configured interval will be assigned a weight of zero. For example, if only the 5-second average is desired, the following can be used:

SW-GSLB-Controller (config-gslb-policy) #connection-load intervals 6 5

SW-GSLB-Controller (config-gslb-policy) #connection-load weights 1

Thus, even though 6 intervals are configured in the above example, all the others are nullified due to zero weights.

By default the connection-load metric is not included in the GSLB algorithm. Once the connection-load limit is configured, the metric is included after the geographic-location metric in the metric order according to one embodiment, such as shown in FIG. 2B. It is understood that the metric order can be changed or customized.

At act 115, if there are no multiple candidates at the top of the IP list that have passed the connection-load metric (or there are none of equal rank), then the IP address list is sent to the client program 28 at act 108. After act 115, if multiple sites are of equal rank for the best site, the IP addresses can then be reordered based upon available session capacity (act 109). For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. For example, if the tolerance limit is 10%, switch 18A will have to have at a minimum 100,000 more sessions available than switch 22B to be preferred. If an IP address is preferred (act 110), the IP address will be placed at the top of the IP address list, and is then returned to the requesting entity at act 108. Otherwise, if the session capacity metric does not resolve the best IP address, then the GSLB metric applies the active bindings metric at act 122.

According to an embodiment, active bindings is a measure of the number of active real servers (e.g., the servers 26A, 26B, etc.) bound to a VIP address residing on a GSLB site (e.g., the sites 20 or 24). The active bindings metric bases its selection of the best IP address on this number of active servers and prefers a VIP with the highest number of active bindings. In effect by selecting the VIP with the highest number of active bindings, the active bindings metric allows the VIP with the largest server capacity to handle a correspondingly greater load of traffic.

An embodiment of the active bindings metric is an optional metric in the GSLB algorithm, and is disabled by default. When enabled, the active bindings metric is placed after the session capacity metric of act 102 in the GSLB algorithm. The default metric order can be changed anytime using the metric-order command (or other suitable command) at the policy configuration level. To use the active bindings metric, the user enables the metric in the GSLB policy.

As part of the GSLB protocol communications between the GSLB switch controller 401 and the remote metric agent 407 (indicated in FIG. 3 as the Foundry GSLB protocol communication between the metric collector 406 and the metric agent 407), the metric agent 407 periodically reports the information necessary for the GSLB switch controller 401 to implement the active bindings metric. This information includes, for each VIP address on the agent SI (e.g., the site switch 18A in FIG. 3), the virtual ports configured and the number of active real servers bound to the virtual port(s). The GSLB switch controller 401 processes the information from the metric agent 407 and for each VIP of interest, stores the number of active bindings for the respective application port.

If the metric agent 407 at the site switch is running a version of code that does not support the active bindings metric, the metric agent 407 of one embodiment will not report any information specific to the active bindings metric. In this case, the GSLB switch controller 401 assumes a default active bindings value of one (1) for each VIP address residing on that site, if the VIP address is active as determined by the GSLB health check metric. If the VIP address is not active or is down, the active bindings value is zero (0). The same logic applies to an IP address that is a real server. The active bindings value is either 0 or 1, depending on the health check of the real IP address.

When the active bindings metric is enabled, at the active bindings metric stage (act 122) in the GSLB algorithm, the GSLB switch controller 401 evaluates each IP address in the DNS reply from the authoritative DNS server 16, and selects the IP address with the highest value of active bindings. The number of active bindings for an IP address is defined as follows in one embodiment:

If the IP address is a VIP address residing on a remote site that supports the active bindings metric:
  ActiveBindings$_{vip}$=NumActiveRealServersBoundFor
    ApplicationPort$_{vip}$
If the IP address is a VIP address residing on a remote site that is running older versions of GSLB agent code and hence does not support the active-bindings metric:
  ActiveBindings$_{vip}$=1, if the VIP address has passed a health check; and
  ActiveBindings$_{vip}$=0, if the VIP address is down.

If the IP address is a real server:
  ActiveBindings$_{ip}$=1, if the real IP address is determined active by the GSLB health check mechanism; and
  ActiveBindings$_{ip}$=0, if the real IP address is down.

If all potential candidates have zero or equal value of active bindings, the active bindings metric considers all of them to be equal and passes them to be evaluated by the next stage in the GSLB algorithm at act 124. Likewise, if two or more IP addresses have the highest value of active bindings, the active bindings metric will make no selection and passes all candidates with the high value to the next stage in the GSLB algorithm at act 124.

To use the active bindings metric, the metric is enabled in the GSLB policy or algorithm. The active bindings metric can be enabled/disabled at the "gslb policy" config level of the CLI using the following example command:
  SLB-ServerIron(config-gslb-policy)# [no] active-bindings
The active bindings value for each IP address can be viewed using the CLI command "show gslb dns zone," with the example syntax shown below:
  SLB-ServerIron(config)# show gslb dns zone If the active bindings metric at act 122 does not resolve the best VIP address, then act 111 then attempts to a resolution based upon a "flashback" speed. The flashback speed is a time required for a site switch to respond to layers 4 and 7 health checks by the GSLB switch. The flashback speed is thus a measure of the load on the host server. Again, the preferred IP address will correspond to a flashback speed exceeding the next one by a preset tolerance limit.

In one embodiment, flashback speeds are measured for well-known applications (layer 7) and their corresponding TCP ports (layer 4). For other applications, flashback speeds are measured for user selected TCP ports. Layer 7 (application-level) flashback speeds are compared first, if applicable. If the application flashbacks fail to provide a best IP address, layer 4 flashback speeds are compared. If a host server is associated with multiple applications, the GSLB switch selects the slowest response time among the applications for the comparison. At act 112, if a best IP address is resolved, the IP address list is sent to client program 28 at act 108. Otherwise, at act 113, an IP address in the site that is least often selected to be the "best" site is chosen. The IP address list is then sent to client program 28 (act 108).

Upon receipt of the IP address list, the client program 28 uses the best IP address selected (i.e., the top of the list) to establish a TCP connection with a host server. Even then, if there is a sudden traffic surge that causes a host server to be overloaded, or if the host servers or the applications at the site become unavailable in the mean time, the site switch can redirect the TCP connection request to another IP address using, for example, an existing HTTP redirection procedure.

To provide an RTT under an embodiment of the present invention described above, at the first time a client accesses an IP address, a site switch (e.g., site switch 22A of FIG. 2) monitors the RTT time—the time difference between receiving a TCP SYN and a TCP ACK for the TCP connection—and records it in an entry of the cache database. The RTT time measured this way corresponds to the natural traffic flow between the client machine and the host server specified, rather than an artificial RTT based on "pinging" the client machine under a standard network protocol. Periodically, the site switches report the RTT database to a GSLB switch along with load conditions (e.g., number of sessions available). The GSLB switch aggregates the RTTs reported into a proximity table indexed by network neighborhood. (A network neighborhood is the portion of a network sharing a prefix of an IP address.) The GSLB switch can thus look up the RTT for a client machine to any specific host server, based on the client's network neighborhood specified in the client's IP address. From the accesses to the host servers from a large number of network neighborhoods, the GSLB switch can build a comprehensive proximity knowledge database that enables smarter site selection. In order to keep the proximity table useful and up-to-date, the GSLB switch manages the proximity table with cache management policies (e.g., purging infrequently used entries in favor of recently obtained RTTs). The proximity data can be used for all IP addresses served by each site switch.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while various configuration commands or other software commands are explained above using a certain specific syntax, it is appreciated that this syntax is merely illustrative. Other types of commands, operations, or syntax can be used to perform the desired operations and settings.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of providing load balancing, the method comprising:
   determining, by a first network device to load balance, from at least one report provided to the first network device by at least one second network device, a number of active host servers bound to each of a plurality of virtual addresses, wherein the report comprises information corresponding to a configuration of one or more virtual ports for each of the virtual addresses and a number of active real servers bound to the one or more virtual ports;
   receiving, by the first network device, a list of virtual addresses; and
   arranging, by the first network device based on the at least one report provided to the first network device by a second network device, the virtual addresses in the list of virtual addresses to identify at least one virtual address, having a highest determined number of active host servers bound to it, from the list as a candidate optimum virtual address to receive traffic,
   wherein the first network device is configurable as a proxy to an authoritative domain name system (DNS) server that resolves a name into the addresses in the list.

2. The method of claim 1, wherein at least one of the virtual addresses in the list is configurable at a second network device.

3. The method of claim 1, wherein arranging the virtual addresses comprises arranging the virtual addresses according to a load balance algorithm, and wherein the candidate optimum virtual address is determined using a load balance algorithm after evaluation of a session capacity metric that represents a maximum number of sessions able to be served by at least one second network device corresponding to a virtual address in the list.

4. The method of claim 1, wherein receiving the list of virtual addresses comprises receiving, by the first network device, a DNS reply generated by an authoritative DNS server and having the list of virtual addresses contained therein.

5. The method of claim 1, wherein receiving comprises receiving, by the first network device, the list of virtual addresses from an authoritative domain name system (DNS) server that resolves a name into the virtual addresses.

6. An apparatus, comprising:
   a first network device to load balance, configurable as a proxy to an authoritative domain name system (DNS) server that resolves a name into addresses in a list of virtual addresses, to:
     receive the list of virtual addresses; and
     arrange the list of addresses and to identify a candidate optimum address as one of the addresses having a largest number of active servers bound to it, as determined by the first network device based on at least one report provided to the first network device by at least one second network device, wherein the reports comprise information corresponding to a configuration of one or more virtual ports for each of the virtual addresses and a number of active real servers bound to the one or more virtual ports.

7. The apparatus of claim 6, wherein the first network device includes a controller to arrange the list of addresses and identify the candidate optimum address.

8. The apparatus of claim 6, wherein at least one of the addresses in the list includes a virtual address configurable at a network device.

9. The apparatus of claim 6, wherein the first network device is configured to arrange the list of addresses according to a load balance algorithm, and select the candidate optimum address using the load balance algorithm after evaluation of a session capacity metric that represents a maximum number of sessions able to be served by at least one of the plurality of second network devices corresponding to an address in the list.

10. The apparatus of claim 6, wherein the first network device is configured to receive the list of addresses in a DNS reply generated by an authoritative DNS server that resolves a name into the addresses.

11. A network apparatus for performing global server load balancing, comprising:
    a first network device to switch; and
    a controller configured to:
      arrange a list of virtual addresses; and
      identify a candidate optimum address as one of the addresses having a largest number of active servers bound to it based on at least one report provided to the network apparatus by at least one second network device, wherein the network apparatus is configurable as a proxy to an authoritative domain name system (DNS) server that resolves a name into the addresses in the list and wherein the reports comprise information corresponding to a configuration of one or more virtual ports for each of the virtual addresses and a number of active real servers bound to the one or more virtual ports.

12. The network apparatus of claim 11, wherein at least one of the addresses in the list includes a virtual address configurable at a network device.

13. The network apparatus of claim 11, wherein the controller arranges the list according to a load balance algorithm, and wherein the candidate optimum address is identified through the load balance algorithm after evaluation of a session capacity metric that represents a maximum number of sessions able to be served by at least one second network device corresponding to an address in the list.

14. The network apparatus of claim 10, wherein the network apparatus receives the list of addresses in a DNS reply generated by the authoritative DNS server.

* * * * *